United States Patent

Zucknovich et al.

[11] Patent Number: 5,940,843
[45] Date of Patent: Aug. 17, 1999

[54] INFORMATION DELIVERY SYSTEM AND METHOD INCLUDING RESTRICTION PROCESSING

[75] Inventors: Stephen M. Zucknovich, Wayne; Jacques Leisy, Bridgewater, both of N.J.; Eduard Kitain, Brooklyn, N.Y.; Yuri Urazov, Forest Hills, N.Y.; George Baird, New York, N.Y.; Paul Blazek; Dmitry Prohorov, both of Forest Hills, N.Y.; Michael Kolfman, Brooklyn, N.Y.; Alex Yackubovich, Highland Park, N.J.

[73] Assignee: Multex Systems, Inc., New York, N.Y.

[21] Appl. No.: 08/947,257

[22] Filed: Oct. 8, 1997

[51] Int. Cl.⁶ .................................................. G06F 17/21
[52] U.S. Cl. ............................... 707/516; 707/2; 707/9; 707/10; 705/35; 395/188.01; 395/200.49
[58] Field of Search ................................. 707/9, 10, 516; 707/2; 705/35; 395/200.49, 188.01

[56] References Cited

U.S. PATENT DOCUMENTS

| | | | |
|---|---|---|---|
| 5,509,074 | 4/1996 | Choudhury et al. | 380/23 |
| 5,727,156 | 3/1998 | Herr-Hoyman et al. | 395/200.49 |
| 5,784,562 | 7/1998 | Diener | 395/200.47 |
| 5,802,518 | 9/1998 | Karaev et al. | 707/9 |
| 5,802,530 | 9/1998 | Van Hoff | 707/513 |
| 5,819,301 | 10/1998 | Rowe et al. | 707/513 |
| 5,822,539 | 10/1998 | Van Hoff | 395/200.66 |

*Primary Examiner*—Paul V. Kulik
*Assistant Examiner*—Jean R. Homere
*Attorney, Agent, or Firm*—Kenyon & Kenyon

[57] ABSTRACT

The electronic distribution of research documents over the world wide web or other network to investors. A repository server receives research documents from contributors. A restriction subsystem server is selectively coupled to the contributor workstation. The restriction subsystem server which includes manages and stores "restriction" and "review" information of companies, relative to contributors. A contributor identifies (via electronic communication or otherwise) to the restriction subsystem server a "restriction" and/or "review" status of a company relative to the contributor. A particular company may be identified as "RESTRICTED" if the contributor has a current banking or financial interest in the company. Additionally, a company may be identified as "UNDER REVIEW" if the contributor believes its opinion about the company may change based on a news event. Moreover, a company may be identified as "UNDER EXTENDED REVIEW," if, for example, the contributor is not presently "covering" that company. Each time the repository server is queried for a list of reports or documents (i.e., document titles or headlines), the repository server determines whether to provide a particular title to the viewer workstation (via a viewer server or web server) to the user based on the restriction status of the contributor of the document relative to the restriction status of the company or companies associated with the document.

9 Claims, 16 Drawing Sheets

○ HOME PAGE  ○ COMMENTS  ○ QUICK GUIDE  ○ NEW FEATURES

*Bulletin Board*

(SEARCH) ○Profiles ○Portfolio ○Alerts ○Preferences ○Quotes ○SEC Filings

120  $=Multex Research On-Demand pay-per-view reports. <u>Click here for more information.</u>

[Refresh] [Summary] [AM Notes]          Profiles: [(None Selected)▽] [Run]
[View All 375]

Latest 100 of 375 Documents

| Submit | Authors | Pgs | Size | Symbol | Syn | Headline |
|---|---|---|---|---|---|---|
| 09:48AM | Midland Walwyn Ca... | 1 | 19K | | Syn | U.S. Employment - May |
| 09:47AM | Midland Walwyn Ca... | 1 | 19K | | Syn | Canadian Employment - May |
| 09:39AM | Merrill Lynch Pri... | 1 | 27K | | | Job Report Shows Moderation, Bu |
| 09:39AM | Merrill Lynch | 1 | 27K | | | Job Report Shows Moderation, Bu |
| 09:39AM | Merrill Lynch Pri... | 13 | 44K | MLNONO | | CURRENT RESTRICTIONS 9:30AM |
| 09:33AM | ABN Amro Chicago ... | 23 | 204K | AMRS | Syn | AmerUs Life Holdings, Inc. |
| 09:32AM | Legg Mason Wood W... | 10 | 105K | COF | Syn | Capital One Financial Corp. Pur |
| 09:29AM | Merrill Lynch | 2 | 42K | PARKF | | PARK FOOD:The Chips are Down |
| 09:26AM | ING Barings | 3 | 67K | 0008.HK... | | Hong Kong Telecom (HOLD) : A red |
| 09:26AM | ING Barings | 4 | 43K | INGB JH... | | South African Daily News |
| 09:25AM | ING Barings | 2 | 47K | INGB | | N.A.V. discounts put some life |
| 09:23AM | ING Barings | 2 | 127K | INGB 6326 | | Kubota (NEUTRAL) : Follow up to |
| 09:22AM | ING Barings | 2 | 127K | INGB 6301 | | Komatsu excimer laser productio |
| 09:22AM | ING Barings | 2 | 48K | INGB 5725 | | Sumitimo Sitix (HOLD) : Company |
| 09:21AM | ING Barings | 2 | 279K | INGB | | Dutch Daily News |
| 09:20AM | Merrill Lynch Pri... | 4 | 58K | | | Grains Opening Comment |
| 09:19AM | ING Barings | 2 | 46K | INGB | | Japan weekly economic preview ( |
| 08:41AM | Midland Walwyn Ca... | 1 | 20K | IPS | Syn | IPSCO Inc. |
| 08:41AM | Midland Walwyn Ca... | 1 | 20K | HBC | Syn | Hudson's Bay Company |
| 08:40AM | Midland Walwyn Ca... | 2 | 27K | CM | Syn | Canadian Imperial Bank of Comme |
| 08:37AM | Merrill Lynch Pri... | 2 | 42K | | | London & New York Metals Commen |
| 08:36AM | Merrill Lynch Pri... | 3 | 35K | MLNO24 | | 24-Hour Restriction List |
| 08:36AM | Merrill Lynch | 2 | 45K | CMS DTE | | UTILITIES-ELECTRIC:Util: MI Res |
| 08:36AM | Merrill Lynch Pri... | 2 | 45K | CMS DTE | | UTILITIES-ELECTRIC:Util: MI Res |
| 08:36AM | Merrill Lynch | 2 | 40K | UVN JCO... | | MEDIA-BROADCASTING:Broadcast: W |
| 08:36AM | Merrill Lynch Pri... | 2 | 40K | UVN JCO... | | MEDIA-BROADCASTING:Broadcast: W |
| | Equitable Securities | | | | | Morning Notes for Equitable Sec |
| | Goldman Sachs | | | | | Morning Notes for Goldman Sachs |
| | Merrill Lynch | | | | | Morning Notes for Merrill Lynch |
| | Merrill Lynch Pri... | | | | | Morning Notes for Merrill Lynch |
| | New York Research | | | | | Morning Notes for New York Rese |
| | Paine Webber | | | | | Morning Notes for Paine Webber |
| | Southcoast Capita... | | | | | Morning Notes for Southcoast Ca |

Latest 100 of 375 Documents ( 50 Research Documents, 28 Morning Notes)

[Refresh] [Summary] [AM Notes]          Profiles: [(None Selected)▽] [Run]
[View All 375]

Friday, June 06, 9:56AM EDT

Home | Comments | Quick Guide

Search | Bulletin Board | Profiles | Portfolios | Alerts | Preferences | Quotes | SEC Filings

FIG. 2

○HOME PAGE  ○COMMENTS  ○QUICK GUIDE                              ○NEW FEATURES

  *Search*

○Bulletin Board  ○Profiles  ○Portfolio  ○Alerts  ○Preferences  ○Quotes  ○SEC Filings

[Submit]  [Count Only]  [Summary]  [AM Notes]  [Reset]  [Store Search]

Symbols: [                    ]    [Symbol Guide]

☐ Search for ticker symbols in document text also

For Period    [Last 14 Days ▽] or From[          ] To[          ]
Of:

Keywords:  [                                              ]

Contributors: | Multex Corporate Register                        |▲|
              | [ All Contributors ]                             | |
              | ABN Amro Chicago Corporation                     | |
              | Adams, Harkness & Hill                           | |
              | Alex Brown & Sons                                | |
              | Auerbach Grayson & Co. Inc.                      |▽|

Industries:   | [ All Industries ]                               |▲|
              | ADVERTISING                                      | |
              | AEROSPACE                                        | |
              | AGRICULTURE                                      | |
              | AIR TRANSPORTATION                               | |
              | APPAREL & TEXTILES                               |▽|

Regions            Countries                                     Currencies
| [ All Regions ]   |▲|  | [ All Countries ] |▲|  | [ All Currencies ]      |▲|
| AFRICA            | |  | Afghanistan       | |  | Afghanistan Afghani     | |
| ASIA              | |  | Albania           | |  | Albanian Lek            | |
| CENTRAL AMERICA   | |  | Algeria           | |  | Algerian Dinar          | |
| EUROPE            | |  | Angola            | |  | Angola New Kwanza       | |
| FAR EAST          |▽|  | Anguilla          |▽|  | Argentine Peso          |▽|

[Submits] [Counts Only] [Summary] [AM Notes] [Reset] [Store Search]

Friday, June 06, 9:56AM EDT

Home | Comments | Quick Guide

Search | Bulletin Board | Profiles | Portfolios | Alerts | Preferences | Quotes | SEC Filings

FIG. 3

○ HOME PAGE ○ COMMENTS ○ QUICK GUIDE    ○ NEW FEATURES

*Search Results*

(SEARCH) ○ Bulletin Board ○ Profiles ○ Portfolio ○ Alerts ○ Preferences ○ Quotes ○ SEC Filings

[Refresh] [Summary] [AM Notes] [Edit] Profiles: [(None Selected)▼] [Run]
[Store Search]

Documents, Sorted by date, for [Last 14 days ▼] and ( internet )

| Scr | Release | Authors | Pgs | Size | Symbol | Syn | Headline |
|---|---|---|---|---|---|---|---|
| 1 | Jun 06 | Alex Brown & Sons | 7 | 29K | H ICIX ... | | DAILY RESEARCH HIGHLIGHTS |
| 2 | Jun 06 | Merrill Lynch Pri... | 2 | 42K | | | London & New York Metals Co |
| 1 | Jun 05 | Midland Walwyn Ca... | 4 | 106K | | Syn | Daily View - Short Term Fin |
| 1 | Jun 05 | Merrill Lynch Pri... | 4 | 81K | GCI ECP... | | MEDIA-PUBLISHING:Monthly Va |
| 1 | Jun 05 | Merrill Lynch | 4 | 81K | GCI ECP... | | MEDIA-PUBLISHING:Monthly Va |
| 2 | Jun 05 | Hembrecht & Quist | 3 | 501K | CNWK | Syn | CNET, INC.: Cash Endorsemen |
| 1 | Jun 05 | Merrill Lynch Pri... | 4 | 77K | AAPL AS... | | INFO PROC-PERS COMP: Weekly |
| 1 | Jun 05 | Merrill Lynch | 4 | 77K | AAPL AS... | | INFO PROC-PERS COMP: Weekly |
| 3 | Jun 05 | Merrill Lynch Pri... | 2 | 43K | | | TELECOM/EQUIPMENT:recent ev |
| 3 | Jun 05 | Merrill Lynch | 2 | 43K | | | TELECOM/EQUIPMENT:recent ev |
| 3 | Jun 05 | Merrill Lynch Pri... | 2 | 44K | LU NT N... | | TELECOM/EQUIPMENT:Recent Ev |
| 3 | Jun 05 | Merrill Lynch | 2 | 44K | LU NT N... | | TELECOM/EQUIPMENT:Recent Ev |
| 1 | Jun 05 | Merrill Lynch | 2 | 52K | PSIX | | PSINET:Continued Progress |
| 1 | Jun 05 | Merrill Lynch Pri... | 2 | 52K | PSIX | | PSINET:Continued Progress |
| 2 | Jun 05 | C.L. King & Assoc... | 12 | 64K | AGL BLD... | Syn | Company Contacts |
| 1 | Jun 05 | Everen Securities... | 10 | 40K | PSR CER... | | Double Check-A-Month Utilit |
| 3 | Jun 05 | TD Securities, Inc. | 12 | 81K | NN NNC | | Report: Newbridge Networks |
| 1 | Jun 05 | Merrill Lynch | 2 | 65K | | | Country Profile: Pakistan |
| 1 | Jun 05 | Merrill Lynch Pri... | 2 | 65K | | | Country Profile: Pakistan |
| 2 | Jun 05 | Merrill Lynch Pri... | 2 | 42K | | | London & New York Metals Co |
| 1 | Jun 03 | Goldman Sachs | | 10K | ACTION ... | | ACTION in the A.M. - U.S. ( |
| 1 | Jun 03 | New York Research | | 9K | ACTION ... | | ACTION in the A.M. - U.S. ( |
| 1 | Jun 03 | ING Barings | 14 | 274K | GRDZ SC... | | Building Blocks No: 150 - G |
| 1 | Jun 03 | Goldman Sachs | 24 | 685K | ECONOMY | | Global Economics: The Weekl |
| 1 | Jun 03 | Goldman Sachs | 16 | 506K | ECONOMY | | European Economics Analyst |
| 1 | Jun 02 | Midland Walwyn Ca... | 4 | 257K | | Syn | Daily View - Short Term Fin |
| 1 | Jun 02 | Midland Walwyn Ca... | 4 | 106K | | Syn | Daily View - Short Term Fin |
| 1 | Jun 02 | Merrill Lynch Pri... | 4 | 77K | | | TELECOM/SERVICES:Focus On C |
| 1 | Jun 02 | Merrill Lynch | 4 | 77K | | | TELECOM/SERVICES:Focus On C |
| 3 | Jun 02 | Alex Brown & Sons | 9 | 220K | TTEC | | TELETECH HOLDINGS, INC. |
| 5 | Jun 02 | Legg Mason Wood W... | 3 | 30K | T | Syn | Legg Mason Telecom Regulato |
| | | Brown Brothers Ha... | | | | | Morning Notes for Brown Bro |
| | | Goldman Sachs | | | | | Morning Notes for Goldman S |
| | | Gruntal & Co., L... | | | | | Morning Notes for Gruntal & |
| | | Merrill Lynch | | | | | Morning Notes for Merrill L |
| | | Merrill Lynch Pri... | | | | | Morning Notes for Merrill L |
| | | New York Research | | | | | Morning Notes for New York |
| | | Nomura Securities... | | | | | Morning Notes for Nomura Se |
| | | Paine Webber | | | | | Morning Notes for Paine Web |

Latest 100 of 327 Documents (80 Research Documents, 20 Morning Notes)

[Refresh] [Summary] [AM Notes] Profiles: [(None Selected)▼] [Run]
[View All 327] [Edit] [Store Search]

Friday, June 06, 10:08AM EDT

Home | Comments | Quick Guide
Search | Bulletin Board | Profiles | Portfolios | Alerts | Preferences | Quotes | SEC Filings

FIG. 4

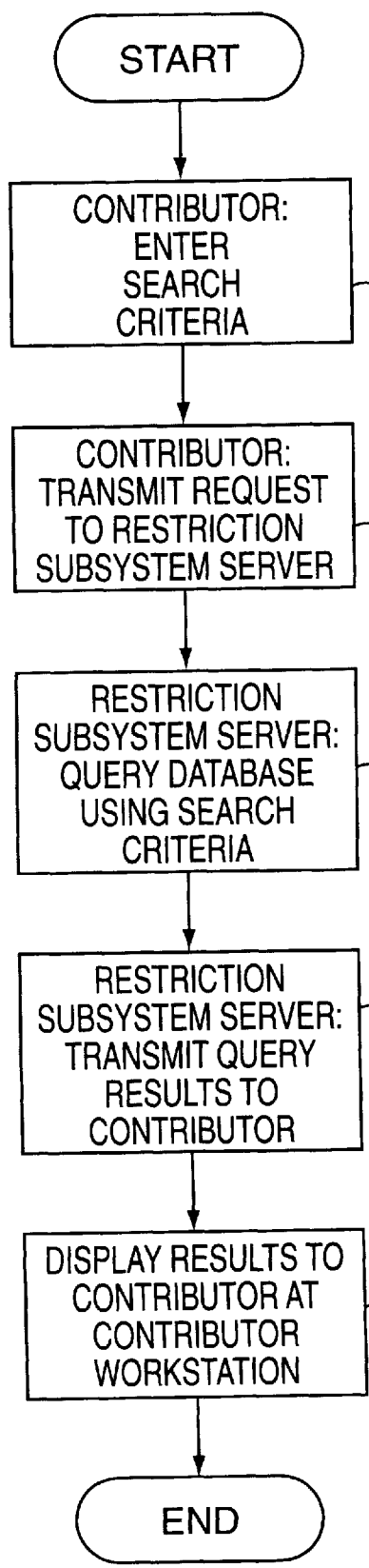
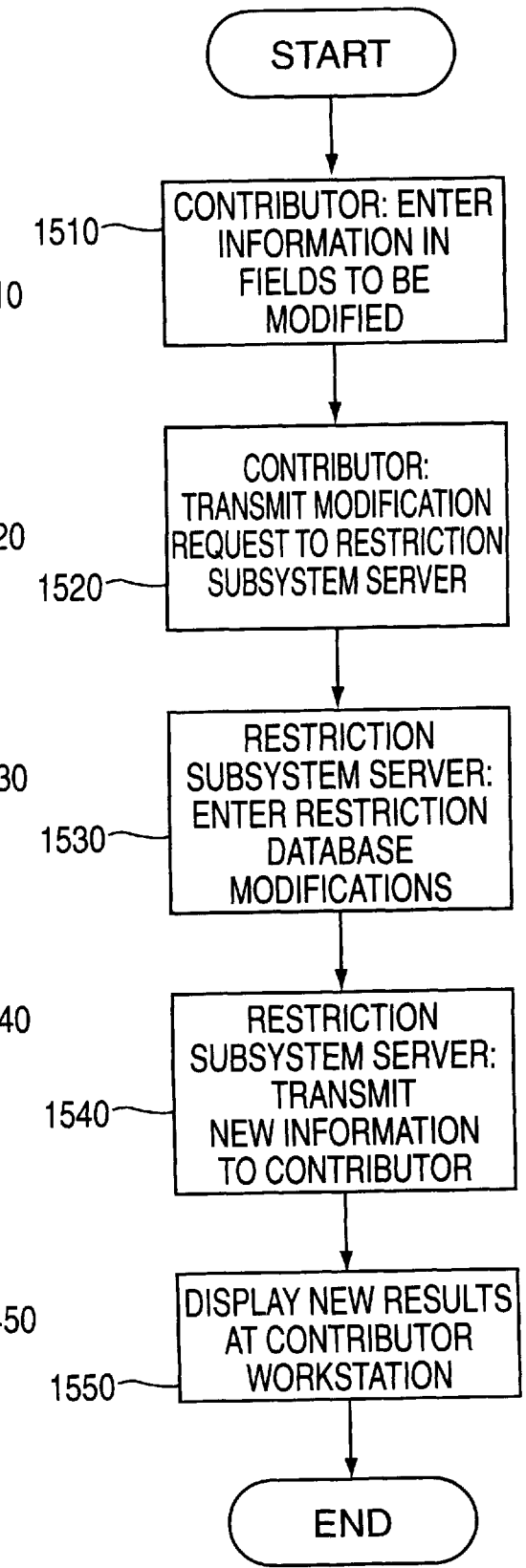
FIG. 14
FIG. 15

& & 5,940,843

INFORMATION DELIVERY SYSTEM AND METHOD INCLUDING RESTRICTION PROCESSING

FIELD OF THE INVENTION

The present invention is directed to a computer-based system and method for the electronic distribution of information, and more particularly, for the distribution of information via the Internet to authorized recipients.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Financial research providers such as brokerage and investment banking firms spend large sums of money creating, printing and distributing thousands of graphic-rich research reports to investors (e.g., customer's, remote sales offices, investment advisors, brokers, portfolio managers, etc.). Research providers seeking to reduce costs may consider distributing these reports electronically, from computer to computer. Electronic distribution is generally cost effective when compared with hard copy distribution methods. Global computer networks, such as the Internet, enable information to be distributed to a wide range of people at locations around the world. One of the many advantages of the Internet, particularly the World Wide Web ("WWW"), is that the communication protocols used are non-proprietary, thus enabling end users to access and use the Internet without the need for customized hardware or software.

Often, research providers wish to provide information to investors or users on a controlled basis. In particular, research providers may wish to provide reports only to particular people, while ensuring that other people (such as, for example, competitors) are not provided with such reports.

Additionally, research providers may wish to control access to reports due to laws or regulations under which the research providers must operate. For example, a research provider may wish to prevent particular users from accessing particular documents in order to comply with certain SEC regulations. When a research provider has a current banking or financial interest in a public company that is the topic of a research report (i.e., a "restricted company"), the research provider may be required by law to restrict its private internal clients from accessing the report. More specifically, SEC laws restrict research providers from influencing the research providers' private clients in any way with regard to a restricted company.

Accordingly, there is a need for a procedure that allows a research provider to restrict research related to restricted companies from being accessed by private clients and investors.

Additionally, when an external event occurs, i.e., a "news" event, a research provider may believe its "opinion" (as reflected in a report, for example) about a particular public company, may change. Accordingly, the research provider may wish to indicate to its investors that the company is "under review." That is, some news event has occurred that is believed to materially affect a public company's financial performance, and therefore the research provider's opinion. For example, assume that a research provider issues a report regarding a particular public company, and that company relies on the availability of a natural resource from a foreign country. If a war breaks out in that supplier company, and thus the public company can no longer acquire that natural resource from the supplier country (due to an embargo, for example), the research provider's opinion regarding the public company may change. Accordingly, there is a need for a procedure that provides a research provider with the ability to indicate to its clients and investors that a particular company is under review.

Also, when a research provider has "no opinion" about a particular public company on which the research provider previously issued an opinion (in the form of a research report, for example), the research provider may wish to indicate to its clients and users that the particular company is under "extended review." This would indicate that previous research reports (and therefore opinions) related to the public company are no longer valid, i.e., the research provider is not "covering" the public company for events that might impact previously rendered opinions.

Accordingly, there is a need for a procedure that allows a research provider to filter or restrict earlier-rendered opinions and reports, or somehow indicate to clients and investors that a company is under "extended review."

SUMMARY OF THE INVENTION

The present invention provides an method and system for controlling the distribution of electronic information based on, in part, an identified relationship between the electronic information provider, e.g., a research provider, and the company or companies that are the subject matter of the electronic information. In a representative embodiment of the present invention, a central repository server is coupled to one or more remote contributor workstations. The information that is stored at the repository server is received from the contributor workstations in electronic form.

According to the representative embodiment of the present invention, the information received from the contributor workstations are files comprising one or more documents. These documents typically would contain text, data, charts, graphs, spreadsheets and the like, or combinations thereof, and may be in many formats. It will be appreciated that any information that can be stored in digital form, such as photographs, videos, sound recordings, etc. may be stored in the files received from the contributor workstations. Files received from the contributor workstations are converted at a central site into predetermined format, e.g., for printable documents, a common viewing format such as, for example, PDF format, and thereafter provided to the repository server. Each document submitted to the repository server is accompanied by a document profile comprising information organized according to predefined fields relating to the document. Information in a document profile may include, for example, a list of ticker symbols of the companies that are related to the subject matter of the document.

In the exemplary embodiment, a restriction subsystem server is selectively coupled to the contributor workstation. The restriction subsystem server, which includes, for example, a restriction database, manages and stores "restriction" and "review" information of companies, relative to contributors. In the exemplary embodiment of the present invention, a contributor identifies (via electronic communication or otherwise) to the restriction subsystem server a "restriction" and/or "review" status of a company relative to the contributor. For example, a particular company may be identified as "RESTRICTED" if the contributor has a current banking or financial interest in the company. Additionally, a company may be identified as "UNDER REVIEW" if the contributor believes its opinion about the company may change based on a news event. Moreover, a company may be identified as "UNDER EXTENDED REVIEW," if, for example, the contributor is not presently "covering" that company.

According to the representative embodiment of the present invention, each user has a user computer, such as, for example, a personal computer with an Intel Pentium processor and a fast modem that the user can use to connect to the Internet. The user computer has one or more local storage devices. In the representative embodiment, the user computer executes Netscape's Navigator browser program. However, other browser programs, such the Mosaic browser or Microsoft's Internet Explorer browser could also be used. As used herein, the browser programs executed by the user computer will be termed "Internet browsers." When the user initially accesses the web server, the user is required to provide a user identification code ("ID") and a password. The web server submits a login request to the CGI program to verify that no other user is using the same ID. According to the present invention, a user is permitted to access the web server from a different user computer or using a different Internet browser; however, the present invention prevents the user (or other users) from "concurrently" accessing the web server from more than one computer or Internet browser using the same ID.

Once the user has provided the ID and password, the repository server will determine what information that user is authorized to receive. According to the present invention, each user has authorization to access all or a subset of the information stored at the repository server.

In the representative embodiment, the repository server can provide the user with a list of new documents that have been recently received by the repository server and which that user is authorized to access. The user may also request a list of documents that fit certain user-specified search criteria. A list of the documents that match that search criteria and which the user is authorized to access is provided to the user computer. The user can then select, request and view documents from these lists.

In the representative embodiment, the repository server also includes a procedure for controlling the ability for a user to display and access a document based on, in part, the "restriction" and/or "review" status (relative to the document contributor) of the company (companies) that is (are) the subject of the document. In the exemplary embodiment, the repository server stores a copy of the restriction database in high speed memory such as, for example, RAM or SRAM. Each time the repository server is queried for a list of reports or documents (i.e., document titles or headlines), the repository server determines whether to provide a particular title to the viewer workstation (via a viewer server or web server) to the user based on the information in the "in memory" restriction database.

In response to a request for a list of documents, the repository server retrieves a list of titles of documents to which the user is "entitled". Additionally, the repository server retrieves any ticker symbols corresponding to the subject matter of each of these documents (such as, for example, those ticker symbols that are provided in each document's corresponding document profile). Each retrieved document title (and corresponding list ticker symbols) is then processed.

The repository server "aggregates" the restriction information for all of the ticker symbols associated with first document. That is, since a document may have a number of ticker symbols associated therewith, the repository system combines the restriction information in order to form aggregate restriction information.

Next, the aggregate restriction information for the title is processed in order to determine whether or not the title should be provided to the user. If the user is an "Internal Private Client" (e.g., an employee of the contributor), the following rules are applied:

If any ticker symbol associated with the document is under restriction and the release date and time of the document is prior to the restriction date and time, the title may be displayed to the user but the title is marked as "restricted." That is, the user can display the title of the document but cannot access the corresponding document.

If any ticker symbol associated with the document is under review or extended review and the release date and time of the document is prior to the review date and time, the title may be displayed to the user, and the title is marked as "under review" or "under extended review." The user may access the corresponding document.

Otherwise, the title may be displayed and the document corresponding to that title may be accessed.

If, instead, the user is an "External Private Client" (e.g., an investor-client of the contributor), the following rules apply:

if a ticker symbol associated with the document is under restriction and the release date and time of the document is prior to the restriction date and time, the title may not be displayed by the user and the user cannot access the corresponding document;

if a ticker symbol associated with the document is not under restriction, but the a ticker symbol associated with the document is either under review or under extended review AND the document release date is prior to the review date and time, the title may not be displayed by the user and the document associated with that title cannot be accessed by that user;

otherwise, the title may be displayed and the document corresponding to that title may be accessed.

This process is repeated for all titles in the list.

The present invention is ideally suited for providing investment research reports to investors and investor advisors. Brokerage and investment banking firms create mounds of investment research reports on a daily basis concerning thousands of companies and industries. These reports are provided to investors in electronic form. At present, these reports are distributed either by messenger or by mail, or over proprietary networks, requiring the installation and maintenence of expensive hardware, software and communication lines. Because of this expense, the number of users who have access to these proprietary networks is limited. In the representative embodiment, the present invention enables investment research reports to be securely distributed to investors over the Internet. The present invention overcomes the disadvantages of a proprietary network and enables investment research reports to be distributed to a wider range of investors who are authorized to receive such reports.

BRIEF DESCRIPTION OF THE DRAWINGS

FIG. 2 is an example bulletin board screen display.

FIG. 3 is an example document query form screen display.

FIG. 4 is an example query results screen display.

FIG. 14 is a flowchart illustrating an exemplary procedure for displaying, at a contributor workstation, the status of a particular company (relative to the contributor).

FIG. 15 is s flowchart of an exemplary procedure for modifying restriction/review information in the restriction database.

DETAILED DESCRIPTION

For ease of description, the embodiment of the present invention described herein is that used for the electronic distribution of investment research reports and morning meeting notes ("reports") to investors via the Internet's World Wide Web ("WWW"). However, the invention is not so limited, and can be used, where appropriate, for the electronic distribution of other types of information via other types of networks.

As used herein, the terms "investor" and "user" include any end user who is permitted to receive or access information via the present invention, such as, for example, customers of brokerage and investment banking firms, employees of brokerage and investment banking firms, investment advisors, brokers, bankers, portfolio and fund managers, journalists, analysts, economists, university professors, MBA students, etc.

Figure 1:
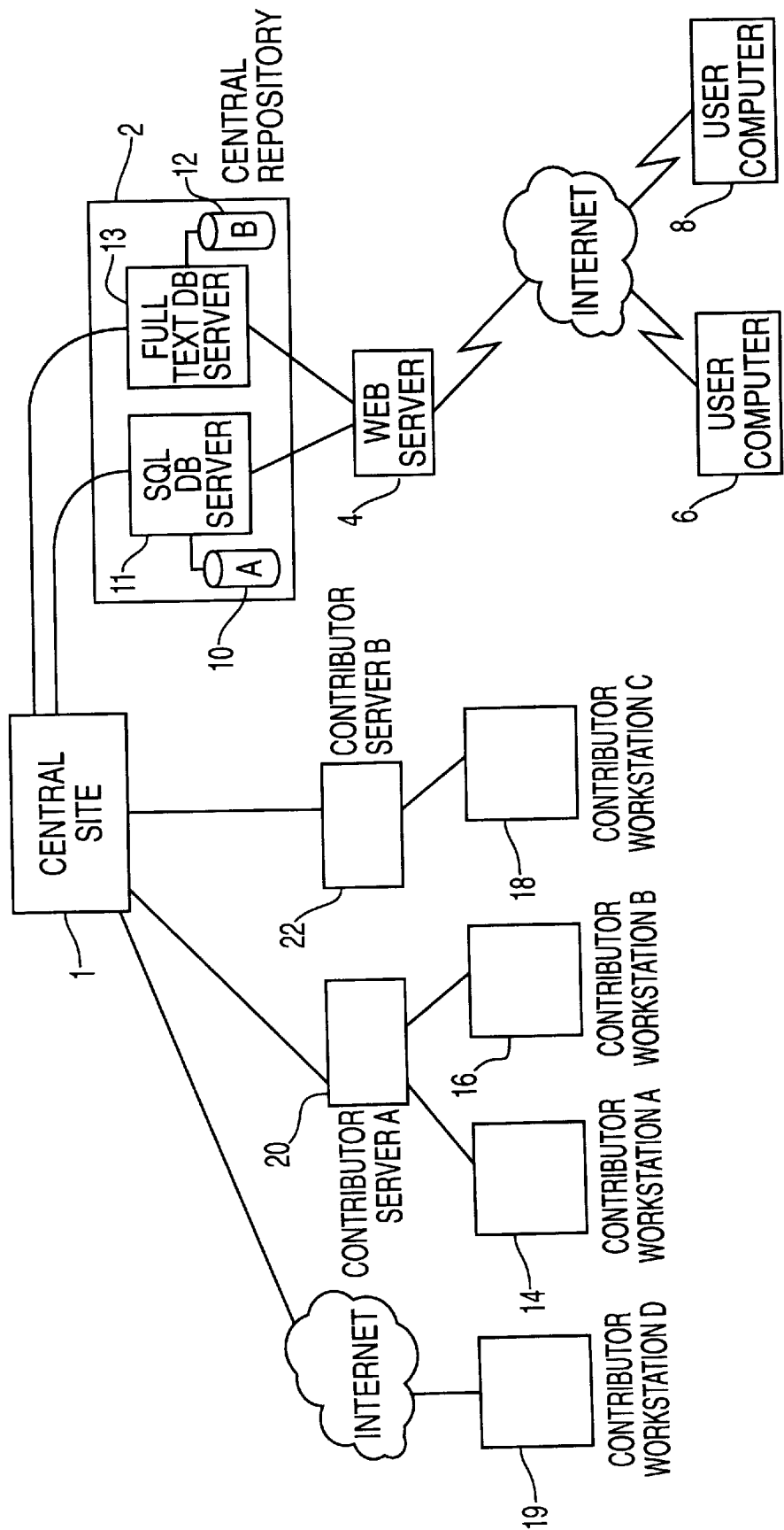
FIG. 1 is a diagram of the overall system architecture of the present invention.

Referring now to the drawings, and initially FIG. 1, there is illustrated an overall system architecture according to the present invention. A central repository server 2 is coupled, via a central site 1, to one or more remote contributor workstations 14, 16, 18, 19. The contributor workstations 14, 16, 18, 19 are used by brokerage and investment banking firms to submit reports to the repository server 2. Optionally, the contributor workstations 14, 16, 18, 19 may be coupled to the repository server 2 via a proprietary network comprising a plurality of contributor servers 20, 22. Alternatively or additionally, a contributor workstation 24 may provide reports to the repository server 2 via the Internet.

In the representative embodiment, the contributor workstations execute a program called Multex Contributor™, described in detail in the user manual titled "MX Contributor—User Guide" available from Multex Systems, Inc. of New York, N.Y. and expressly incorporated herein by reference. The Multex Contributor™ program is a real-time Windows-based document indexing and transfer program used to disseminate reports to the central site 1. The contributor simply completes a form (a document profile) displayed on the screen of the contributor workstation 14, 16, 18, 19, and, at the specified time, the Multex Contributor™ program transfers the report, along with the information in the completed form, to the central site 1.

At the contributor workstation 14, 16, 18, 19, the contributor completes a form relating to the report. First, the contributor selects a report for distribution. The report is stored, usually as a file, in electronic form on the contributor workstation 14, 16, 18, 19 or on a server or network drive coupled to the contributor workstation 14, 16, 18, 19. The report may be in any standard electronic format, for example, Pagemaker, Microsoft Word for Windows, Corel WordPerfect, etc. The form has fields relating to the report, for example, title, author, subject, date and time of creation, distribution level (setting distribution to a default group of investors or one of a set of predefined groups of investors) and expiration time. Optionally, the contributor can enter additional information in the form, such as, for example, ticker symbol(s), industry group, synopsis, country, region, currency, etc. Once the report has been selected and the form completed, the user issues a "contribute" command to the Multex Contributor™ program and the report and all the information in the form is electronically transmitted to the contributor server 20, 22 or directly from central site 1. In the representative embodiment, the reports are "pushed up" from the contributor servers 20, 22 to the central site 1.

In an alternative embodiment, an "auto-contributor" program may be used to automatically contribute reports. The auto-contributor program executes, for example, on a contributor workstation 14, 16, 18, 19 and provides a mechanism for automatically contributing one or a number of documents. This mechanism is particularly well suited for "high volume" contributors.

In an exemplary embodiment, the auto-contributor reads a file (or a number of files), stored at, for example, the contributor workstation 14, 16, 18, 19 or at a contributor server 20, 22) which provide information related to each report to be automatically contributed. The information may include the same information that a contributor would enter into the form described above, e.g., title, author, subject, date, and time of creation, distribution level, expiration time, ticker symbols, etc. Additionally, the information includes the location or address of the file containing the report (or reports), e.g., file path. After reading the file (or files), the auto-contributor program transmits the file (or files), and the corresponding report files to the central site 1.

At the central site 1, the reports are processed. Typically, the central site comprises a network of computer processors. At the central site 1, each report is converted to a predetermined format. In the representative embodiment, all reports received at the central site 1 are converted at the central site 1 into a format that can be read by the Acrobat Exchange program, available from Adobe Systems. The reports are then provided by the central site 1 to the repository server 2.

Where desired, the repository server 2 can also receive, store and enable the distribution of other useful information, such as, for example, news reports received from wire services, government reports, product reviews, etc.

The repository server 2 comprises or is coupled to at least two database servers 11, 13. Each database server is coupled to a database storage device 10, 12. A relational database 10, 11 allows field searching. In the representative embodiment, the relational database 10, 11 is an SQL database server 11 coupled to a storage device 10. A full text database 12, 13 allows word or text searching. In the representative embodiment, the full text database 12, 13 is a full text search database server 13 (for example, a full text search engine available from Fulcrum of Ottawa, Canada) coupled to a storage device 12.

The information contained in the form is indexed in the relational database 11 to allow retrieval of the report by searching on such fields, e.g., searches by author, date, industry, etc. Where necessary, information in the form received from the contributor is mapped into "common" terminology as used by the relational database 11. For example, the terms "sports utilities" and "minivans" may be mapped and stored as the term "automobile." ASCII text is extracted from the report and stored in the full text database 12, 13 for full text searching.

The repository server 2 provides investors with lists of reports received from the contributor workstations 14, 16, 18, 19 and allows investors to request lists of reports that fit certain criteria. The investor can select reports from these lists to down-load, view and/or print. Generally, lists of reports can be generated by the web server 4.

The contributor of a report can be notified that a particular investor has accessed that report. The repository server 2 maintains for each report a list of those who accessed that report. The repository server 2 can transmit that list to the report's contributor on a regular basis and/or when requested by the contributor.

The repository server 2 is coupled to a web server 4 which in turn is coupled to the Internet via, for example, a T1 or ISDN connection. The web server 4 is a high powered server computer that runs a web server program. In the representative embodiment, the web server 4 executes, for example, Netscape's Commerce Server program. The web server program allows web pages (in HTML format) to be accessed by investors. The web server 4 also executes other programs and subroutines as required.

Each investor has a user computer 6, 8, such as, for example, a personal computer with an Intel Pentium processor and a fast modem. The user computer 6, 8 can connect with the Internet via, for example, a commercial Internet Service Provider. In the representative embodiment, the user computer 6, 8 executes an Internet browser program, such as, for example, Netscape's Navigator browser program. The Internet browser can read HTML format, and can also communicate with other programs. This communication is via a program extension called a plug-in. In the representative embodiment, the plug-in is the Acrobat Exchange Interface program, available from Adobe Systems that directs Acrobat Exchange or Acrobat Reader to load and display downloaded ".pdf" files.

The web server 4 includes a web server helper application, which in the representative embodiment is the CGI (common gateway interface) program, that is activated by investors through web pages provided by the web server 4. CGI provides a method for web pages to interact with programs on the web server. CGI lets those other programs process HTML forms and other data coming from Internet browsers, and then lets the other programs send a response back the web server 4 to be delivered to the Internet browser. The response can be HTML files, GIF files, PDF files or any data that the Internet browser can view. Thus, generally, when an Internet browser requests a document from the web server 4, the web server 4 server program finds the document and sends it to the Internet browser. However, if the Internet browser requests a CGI program, the web server 4 server program acts as a middleman between the Internet browser and the CGI program. Other web server helper applications (or interfaces), such as, for example, BGI, NSAPI, ISAPI, or ASP (Active Server Pages) can be used in place of CGI within the principles of the present invention. These applications are extensions to the web server 4.

Access to the web server 4 begins from an investor's Internet browser. Initially, the investor can access "public" web pages generally describing some of the features of the document delivery service of the present invention. If the investor chooses to proceed, the investor selects the "log-in" option from the initial web page.

User Verification

The first step the web server 4 takes in handling an investor request is verifying that the investor is permitted to access the information stored at the repository server 2. This is accomplished using the standard verification procedure built into the communication protocol between Internet browsers and web servers.

The web server 4 uses Netscape's Commerce Server's ability to call custom verification subroutines when a user tries to access CGI's and web pages. The web server 4 executes a subroutine and, using Netscape's NSAPI, receives the ID and password that the investor is asked to provide by the server/browser, and then verifies the ID and password against a database of authorized users (the user database) maintained at the repository server 2. If the user is verified, the Internet browser will be given a verification signature. An investor who is not in the user database, or enters an incorrect password, is denied access to CGI's and web pages on the web server 4 by simply having the subroutine return an "Access Denied" flag to the web server 4. This subroutine maintains an open connection to the user database to improve performance.

Whenever an investor makes a query for a list of reports, the investor's Internet browser sends an HTTP (hypertext transfer protocol) request that represents what the user wants to the web server 4. If the request does not have a verification signature attached to it, the web server 4 sends a command back to the Internet browser, causing it to prompt the user for an ID and password. The Internet browser will then return this information to the web server 4, which will verify that the user is entitled to access the reports stored at the repository server 2. If the user is verified, the Internet browser will be given a verification signature. If not, the user will be prompted again for his ID and password. Once access is verified, the web server 4 will start the CGI program named in the original HTTP request, along with any run-time parameters that are specified in the request. The CGI program first verifies that the user making the request (whose ID is passed to the CGI program by the web server 4 through, for example, an environment variable) is the only one using that ID at that moment. This is done by the following method:

a. The CGI program gets the value of the Internet browser "cookie", and extracts the value for the named pair "mxauth" from the cookie.

b. If the value is empty, the CGI program indicates that this user is accessing the web server 4 for the first time since starting his or her Internet browser. This user then becomes the designated "current user of this ID". A new random value for the "mxauth" part of the browser cookie is generated, stored on the web server 4 under this user's ID, and sent back to the Internet browser, so that the Internet browser can send it back next time.

c. If the value is not empty, the CGI program indicates that this user has previously already accessed the web server 4 since starting the browser program, and has been given an authorizing cookie. If the "mxauth" value of the cookie does not match the value stored on the web server for this user, then this user has been superseded by another user using the same ID. The CGI does not perform the requested task, and tells the user that access is denied. If the "mxauth" value of the cookie does match, then this user is authorized to continue, and the CGI performs the requested task. Each time the user is authorized to continue, the time of the access is stored on the web server 4.

d. A stored cookie value that is over an hour old is considered "stale". A user whose code does not match a stale cookie is allowed access as if the user was initially signing on, as per b. above.

Part of the rationale for this method comes from the lack of a "sign-off" from a user. When a user "leaves" the web server 4 to browse other parts of the WWW, or closes down his or her Internet browser, the web server 4 is not informed.

(For reference, it is noted that cookies are a general mechanism which server side connections, such as CGI scripts, can use to both store and retrieve information on a client side of an Internet connection. A web server, when returning an HTTP object to an Internet browser, may also send a piece of state information which the Internet browser will store. Included in the state object is a description of the range of URLs for which that state is valid. Future HTTP requests made by the Internet browser which fall within that range will include a transmittal of the current value of the state object from the Internet browser to the web server. For no compelling reason, the state object is known in the art as a "cookie.")

Other systems that allow only one instance of an ID to be active at one time rely on a "sign-off" notification to tell when the ID can be used again for "sign-on". Because the web server 4 does not receive a "sign-off", it is assumed that any new user is allowed to "sign-on" with that ID, but all others that are currently using that ID will now be denied further access, until they "sign-on" again (which involves closing down the browser, then restarting it again). Furthermore, step d. is included to keep a user from locking himself out of his own ID if he happens to use browsers from two different locations, such as home and office.

Thus, the following scenarios apply:

Scenario 1:
User 1 signs on to the web server 4 at his office. The CGI marks this browser/user ID combination as the current user.
At 5:00 PM, he goes home, without closing down his browser.
At 5:45 PM he signs on from his home computer. The CGI now marks this browser/user ID as the current user.
At 10:00 PM, he goes to bed, without turning off his browser.
At 8:00 AM the next day, he arrives at work, and tries to access the web server 4 again. Because his 10:00 PM cookie is now "stale", the CGI marks the office browser/user ID as the current user.

Scenario 2:
User 1 signs on to the web server 4 at her office. The CGI marks this browser/user ID combination as the current user.
She then goes to the desk of User 2, and shows User 2 "this new web service", using her own user ID and password to sign on to the web server 4. The CGI marks User 2's browser as the current user of User 1's ID.
After a few minutes, User 1 returns to her original computer, to find that the CGI is denying her access. User 2 has her locked out by using her ID.

This user verification system is particularly well suited in information delivery systems where a fee is charged per ID/password.

Web Server

The web server 4 uses a single CGI program that handles all the types of requests that a user makes to the web server 4. In the representative embodiment, the types of requests that the CGI program can handle are:

Return a list of reports recently received at the repository server 2.

Reformat the current list of reports.

Present a form that allows the user to specify criteria for reports the user wants to access.

Return a list of reports matching the criteria in the form mentioned above.

Return a list of reports summarized by report contributor.

Return a list of reports authored by a specific contributor.

These requests are handled similarly, except for the request for the form that the user fills in to specify criteria for reports that the user wants to access.

Except for the third request listed above, a query is formulated (whose parameters are determined by the run-time arguments given to the CGI from the original HTTP request from the investor) by the web server 4 and sent to the appropriate database 11, 13. A result set (a list of reports) is returned and stored in memory. The CGI then opens a HTML template form that comprises RAL (research access language) elements, fills in each RAL element with data from the result set and sends the contents of the template to the Internet browser through the Web Server 4. (In the case of the reports that are summarized by contributor, the CGI simply condenses the list of headlines internally to summary form, before using the template.) When the output from the CGI is received at the investor's Internet browser, the browser forms it into a "page" of information, along with action buttons that the investor can select to initiate other requests.

The request to present a "report query form" (the third request listed above) calls for the CGI to make several queries from the relational database 11. One query is for a list of all contributors whose reports this investor has authorization (i.e., is entitled) to access. The result set of this query is used to fill a list box, from which the investor is expected to pick the particular contributors whose reports the investor would like to access. Another query is for a list of all industries. The result set of this query is used to fill a list box, from which the investor is expected to pick the particular industries that the investor is interested in. Other queries are for lists of all reports meeting other criteria, such as, for example, countries, currencies, subjects, and document types. These list boxes are defined in the HTML template with RAL elements that are appropriate to this particular user request.

When a query is made, the web server 2 selects the appropriate database to which the query is first routed. In summary, if the query involves text matching (e.g., a full text search) within reports, the query is passed to the full text database 13. If the query does not involve text matching within reports, the query is passed to the relational database 11.

In the representative embodiment, each database comprises a number of database servers networked together. (for example, database server 13 comprises a network of database servers.) The database servers that are available to the CGI are listed in the WEBPUBL.INI file (a CGI initialization file) on the web server 4. When satisfying a non-text matching query, the CGI will attempt to use an SQL type server (e.g., 11) first. If that database server is not available, the CGI will automatically switch to the next available SQL database server. (If all SQL database servers are not available, then the query will be passed on to full text database server (e.g. 13).) When satisfying a text matching query, the CGI will attempt to use an full text database server (e.g. 13). Again, if that server is not available, then its backup will be tried, and so on, until either a server can satisfy the query, or all servers have been found to be down. In addition to this automatic backup system, the CGI practices semi-random selection of servers in an effort to balance the load on the servers. This means that the order that servers are tried is not always the same.

The HTML template forms that the CGI uses rely on the forms mechanism that is part of HTML. This allows the users to select buttons on the pages to submit requests. Each page may have several buttons, and the names of the buttons (the actual visible text in them) are used in the CGI to identify which button the user selected, and therefore, which action to perform. Parameters for a query are taken from other form constructs, such as text fields, list boxes, and combo boxes. When a form does not actively show a parameter value, but it would be convenient for the CGI to maintain its value for the next user request, the values are stored as "hidden" fields in the form. (A hidden field is a form construct defined in HTML for just this purpose.) This allows the parameters of a query to be stored in a page that shows the results of a query, so that they can then be used again as starting values when the user requests the report query form.

Authorization

In the representative embodiment, each user has authorization (i.e., is entitled) to access a subset of the information stored at the repository server 2. The contributor company (i.e., the report producer) determines who has access to each report. For example, an investment bank may designate that one of its reports can be accessed only by its employees and certain investors (e.g., its customers). Another report may be designated as accessible by employees only. A third report may be released for general distribution to all who wish to access that report. Every document contributed by a contributor is identified by a "contributor ID". Furthermore the document is assigned by the contributor to one or many "document groups" owned by the contributor. (Documents usually belong to one document group.)

The authorization information links an investor to a list of user groups. Each user group can include many users. Each investor may be permitted to access documents in one, some or all document groups.

The repository server 2 constantly maintains an up to date list of all the document groups available along with the documents in the relational database 11. This list is updated in real time after a document is added, and completely refreshed daily (e.g., after document removal of expired reports). The list is also updated after a contributor changes the entitlement status of an individual investor (or investor group).

To submit a query, an investor must be identified by the repository server 2. As the investor's credential are checked (see above), the authorization information is retrieved by the repository server 2. This authorization information contains a list of document groups the investor is permitted (entitled) to access.

Optimizations

Two types of optimizations are performed by repository server 2. The first is a simplification of the authorization restriction. The second is an optional optimization performed when the result set has to be sorted; it is aimed at reducing the perceived response time for the first answers to a query.

One of the characteristics of the architecture of the present invention is that each query submitted to a database 11, 13 is submitted as a structure description, rather than a fully formed SQL statement. The actual SQL statement is built by the database server 11, 13 itself. Thus, the optimizations can take place on the raw query definition (i.e., a structure definition) before executing the query. This allows for more powerful query optimization, and immediate query definition analysis to select the proper mechanism to execute it.

In the alternative, the actual SQL statement may be fully formulated and then submitted to the database server 11, 13.

1. Optimization of the authorization restriction

In query definition, the investor can restrict the query to a subset of the contributors the investor has access to. This feature is used to implement queries like "What's new today from XYZ" and "All reports relating to automobiles from PQR."

The purpose of the authorization optimizer is to build the least expensive (with respect to execution time) selection clause, which will restrict the investor's query to the database subset the investor is allowed to access.

The authorization optimizer uses this database content information, combined with the investor's accessible groups, as well as the contributor restriction in the query, to build the restriction clause using the following method.

The repository server 2 builds two lists of groups:

a) the list of groups the investor has requested and has access to.

b) the list of groups the investor has requested but doesn't have access to

Based on the number of elements in these two lists the authorization optimizer will build the proper selection clause.

The following pseudo code describes the actual code used to implement this algorithm:

```
for (all the groups in the investor's allowed group list) do
begin
        if (group is in the query contributor restriction)
            and group is in database)
        then add group to the allowed list
end
for (all the groups in the database) do
begin
        if (group is in the query's contributor restriction)
            and group is not in the investor's allowed list)
        then add group to the disallowed list
end
if (allowed groups list is empty)
    then deny request
else if (disallowed groups list is empty)
    then no restriction
else if (decisionFunction (allowed list, disallowed list))
    then restrict to groups in allowed list
    else restrict to groups not in disallowed list
```

The "decisionFunction" selects the shorter of the two lists, namely, allowed list and disallowed list.

This optimization is more efficient when the database's content is close to the investor authorization, since it works by trimming the unnecessary restrictions for groups without reports in the database.

To improve the efficiency of this optimization when the number of groups in the database grows, the records could be dispatched to different tables based on groups and the same optimization algorithm could be used to select the appropriate table and generate a different restriction clause for every table targeted.

2. Optimization of sorted queries The purpose of the sorted queries optimizer is to provide the investor with a fast answer even when the number of elements to sort is substantial.

Unlike other applications used in memory sorting, database sorting can rely on a buffer being swapped in and out to disk from the main memory. When the number of items to sort becomes significant, these I/O operation can consume a lot of time. When an investor submits a query via the Internet, the repository server 2 via the web server 4 returns the first hundred rows by default, the most recent reports being displayed first. The actual query result may contain thousands of reports. Thus, to display the hundred most recent reports, the database has to sort the whole result set before returning any answer.

In order to provide the investor with a quick answer, the sorted queries optimizer will try to run multiple queries, each for a smaller subset of the query. If the query has to be sorted by the report's date, the sorted queries optimizer divides the requested time period of the query definition into multiple chunks and executes the same query restricted to every chunk. Accordingly, the sorted queries optimizer does not disturb the sorting order.

Based upon tests of real data sets, it was found that it was more efficient to perform only two queries, rather than a lot of them. The first query is performed on the first 10th of the time period, the second one on the remainder period. For some typical queries, the second subquery execution is unnecessary since the first query had already returned the number of rows requested by the investor.

For database 13, the retrieving of a count is orders of magnitude faster than retrieving the full result set. The present invention takes advantage of this characteristic to give an immediate feedback to the investor. As soon as a query is submitted, a count is performed and this information is sent to the web server 4. The web server 4 can take advantage of this feature to return that information to the Internet browser by flushing it's internal buffers. That way, even when the retrieval of the result set takes tens of seconds, the investor gets some feedback in seconds.

Ideally, the sorted queries optimizer is used only for sorted queries and when the number of rows is above a given threshold. The present invention uses the result of the count to trigger the sorted query optimization.

The following pseudo code describes the code used to implement the sorted queries optimizer:

```
Retrieve the count
if (Query is sorted by a time) and (count > = threshold) then
    begin
        if (query definition contains a time range)
            then get the time range from the query definition
            else use an appropriate default value
        add the restriction for 1/10th of the time range
        retrieve the first rows
        rows_still_to_fetch = rows_requested - rows_already_fetched
        if (rows_still_to_fetch > 0)
            begin
                add the restriction for remainder of the time
                range
                retrieve rows_still_to_fetch rows
            end
    end
```

This optimization significantly improves the response time when the time to perform the additional query is egligible compared to the time necessary to sort the full set.

The communication delay inherent in the connection between the Internet browser and the web server 4 may also introduce additional delays hiding some of the optimization benefits.

Templates

According to the exemplary embodiment, the web server 4 executes a research access program. The research access program provides a mechanism that enables an investor to access the information in the databases 11, 13. The research access program can also be implemented as an Internet CGI, which accepts input parameters from HTML forms, and then using templates forms, generates HTML pages comprising information retrieved from the databases 11, 13. The template forms are written in a novel computer language, called herein a "research access language" (or RAL) that describes how to integrate the information retrieved from the databases 11, 13 into this form. The template forms include RAL elements, as discussed in detail below.

In the exemplary embodiment, investors submit queries and receive, in response thereto, a list of reports that satisfy the queries. The queries are constructed from one or more search parameters, including: which contributing company published the report; which stock symbols figure prominently in the report; when the report was published; what industries are featured in the report; keyword search parameters; as well as subjects (e.g., countries, currencies, regions, document class, and docmument type).

An investor may enter search parameters at a user computer 6, 8 via a web page provided by the web server 4. When the investor selects the "submit" button on the web page, the search parameters are forwarded by the Internet browser to the web server 4. The search parameters are used to form a query. The query is submitted to the appropriate database 11, 13 and a list of matching documents is generated. This list is formatted on the web server 4 into HTML form, and sent to the investor at the user computer 6, 8, where the investor's Internet browser displays the list to the investor.

The input to the research access program of the present invention comes from HTML forms completed by investors. The fields that can be searched on for document queries (and the expected values of such fields) include:

date: A date range from "today" backwards, matching a document's official release date. Possible values include:

```
0  Today
1  Last 2 Days
2  ThisWeek
3  Last 7 Days
5  Last 14 Days
7  This Month
```

-continued

| | |
|---|---|
| 8 | Last 30 Days |
| 10 | All Dates |
| 12 | Last 60 Days |
| 13 | Last 90 Days | ticker: A field for ticker symbols.

query: A field for "free text" for searches of the document text. Logical expressions can be used, including the ampersand ('&') for a logical 'and', and the pipe character ('|') for a logical 'or'. Parenthesis can be used for grouping expressions, and double quotes can be used to group words into phrases. All free text searches are not case sensitive.

For example:

| | |
|---|---|
| microsoft | Find documents with 'microsoft' in their text. |
| ibm & microsoft | Find documents with 'ibm' and 'microsoft' in their text. |
| ibm \| microsoft | Find documents with either 'ibm' or 'microsoft' in their text. |
| ibm & ( microsoft \| apple ) | Find documents with 'ibm', and either 'microsoft' or 'apple' in their text. |
| "earnings report" | Find documents with the phrase 'earnings report' in their text. | contributors: A field for a comma separated list of contributor ID's.

industries: A field for a comma separated list of industry ID's.

There are a number of options for displaying information to an investor. Some of these options are based on technical limitations (such as line speed), while others are based on the preferences of the investor (e.g., tabular output, prose, etc.). In order to react quickly to changes in display requirements, the research access program of the present invention utilizes template forms to format HTML pages comprising search results. According to the present invention, information retrieved from the databases 11, 13 is placed in HTML page format according to changeable template forms for said HTML pages.

Thus, input (included in the HTML forms completed by investor) to the research access program of the exemplary embodiment from an investor can include view mode parameters relating to the format in which the investor wishes to receive the search results and other information. By supplying view mode parameters, the investor can indicate to the web server 4 the desired format of information, including how many records of information are displayed. View mode parameters (and expected values) include:

FT: Form Type. Expected values are 'L' for 'list format', 'T' for 'table format', and 'D' for double line format.

viewmode: This field indicates whether all records that are returned by a query should be displayed (within reason—in the representative embodiment, there is a display limit of 1000 records), or whether the number of records displayed should be limited to a predetermined number. If the 'viewmode' value is set to 'all', then all records will be displayed. Otherwise, the number of records displayed will be limited to the predetermined number.

To submit a query, the user completes the fields discussed above and then selects a "submit" button. When an investor submits a query, the name and value of the HTML form 'submit' button selected are treated as input. In the representative embodiment, if the following strings appear in the 'name' of the submit button, they are treated in the following manner:

submit: Make a query according to the parameters listed above.

bboard: Same as submit, except that the query formulated includes the requirement that only documents recently received at the repository server 2, e.g. since midnight, be returned.

long: Change the view mode to a double line format.

short: Change the view mode to a list format.

table: Change the view mode to a table format.

summary: Same as submit, but also requests generation of a summary list, breaking down the number of documents that match the query by submitting contributor, and the document type (research document, or morning call note).

In addition, generates stored HTML files for each contributor in the summary, with one listing of the individual research documents, and another for the individual morning call notes. In the summary list, generates links to the stored HTML files.

notes: Same as summary.

all: Change the view mode to view all documents.

last: Change the view mode to view the 100 most recent documents.

query: Generate a query form for the user.

count only: Display the number of documents that match the query that matches the current parameters.

company search: Generate a list of companies (named symbols), and place the list in a form from which the user can choose a company to perform a search upon.

choose symbol: Generate a query form for the user, presetting the ticker input item to the value selected from a symbol list.

The program output, of course, depends upon the input including which 'submit' button was selected by the user. The user's choice of a submit button determines which template will be chosen for output.

Additionally, templates may be preset for a user or a group of users. Thus, all users from a particular company or geographic area may be assigned one group of templates and all users from another company or geographic area may be assigned another group of templates.

Once a template file is opened, the characters in it are passed directly through to standard output (the normal CGI output channel), until an RAL element is encountered. In that case, the RAL element is processed according to the rules set forth below, and the output from the RAL element is also sent to standard output, inserted into the stream of characters in the template.

The following are examples of templates that may be used:

| | |
|---|---|
| resultrl.tpl: | List form output for a query. |
| resultrd.tpl: | Double line output for a query. |
| resultrt.tpl: | Table form output for a query. |
| resultcl.tpl | List form output for a query, broken down by contributor and document type during a summary. |
| resultcd.tpl | Double line output for a query, broken down by contributor and document type during a summary. |

-continued

| | |
|---|---|
| resultct.tpl | Table form output for a query, broken down by contributor and document type during a summary. |
| resultq.tpl | Query form. |
| resultx.tpl | Query count. |
| resulti.tpl | Symbol Guide form. |
| resultt.tpl | Standard HTTP header prepended to each of these templates. |
| bboardrl.tpl: | List form output for a bulletin board. |
| bboardrd.tpl: | Double line output for a bulletin board. |
| bboardrt.tpl: | Table form output for a bulletin board. |
| bboardcl.tpl | List form output for a bulletin board, broken down by contributor and document type during a summary. |
| bboardcd.tpl | Double line output for a bulletin board, broken down by contributor and document type during a summary. |
| bboardct.tpl | Table form output for a bulletin board, broken down by contributor and document type during a summary. |

If a query is submitted with no parameters filled in, the query is termed a bulletin board query and requests the most recently available documents on all subjects.

Research Access Language

The following is a description of the RAL of the present invention. RAL elements begin with a start token, finish with an end token, and contain attributes in between. The start token is followed by a "white space" character. Attributes are indicated by the name of the attribute, followed by an equals sign ("="), followed by the value of the attribute. An attribute name consists of consecutive alphabetic characters. An attribute value consists of consecutive non-white space characters, unless it is enclosed by double quotes, in which case it consists of all characters enclosed in a pair of double quotes. An end token contained within a non-quoted attribute value will truncate the attribute value, and the language element. The following is a syntax description of an RAL element:

```
start-token     := "{mx" <white-space>
white-space     := (any ASCII character value between 1 and 32,
                   inclusive)
end-token       := "}"
attribute       := <attribute-name> "=" <attribute-value>
attribute-name  := "end" | "name" | "true" | "width" | "align" |
                   "start" | "false" | "empty" | "match" | "format" |
                   "select" | "quotes"
attribute-value := <double-quotes> <any-characters> <double-quotes> |
                   <any-non-white-characters> (except end-token)>
```

Examples:

```
{mx name=headline align=left width=50}
{mx start=documents}
{mx name=synopsis match=1 true=Yes false=""}
```

Attribute Names
align
The 'align' attribute specifies the alignment of the output from the current element, within the width indicated by the 'width' attribute in the element.
Possible values
   left (default)
   center
   right
See also
   width
empty
The 'empty' attribute specifies what should be displayed as output for the current element, if the evaluated output for the element (before padding or alignment) is an empty string. This attribute is different from others, in that it remains in effect for all following language elements, until its value is changed.
Possible values
   (Any string. Use "" to indicate an empty string.)
end
The 'end' attribute marks the end of a loop. The attribute value indicates which type of loop the current element marks the end of.
Possible values
   document
   contributorlist
   industrylist
   symbollist
See also
   start
false
The 'false' attribute specifies a string value to be displayed as output for the current element if the evaluated value for the 'name' attribute does NOT match the value of the 'match' attribute. This string may also use the '%s' feature described under 'format'.
Possible values
   (Any string. Use "" to indicate an empty string.)
See also
   match, true, format
format
The 'format' attribute specifies simple output formatting for output of the current element. Its format is the same as a C language printf ( ) format string, but allows only string formatting (%s), and only one occurrence of that within the format string. The evaluated value of the element, as a string, is used as the value to fill the '%s' in the formatting string. Some examples are:

| Format string | Element Value | Output Result |
|---|---|---|
| "%s" | "ABC Corp." | "ABC Corp." |
| "%15s" | "ABC Corp." | "ABC Corp.      " |
| "%-15s" | "ABC Corp." | "      ABC Corp." |
| "%5.5s" | "ABC Corp." | "ABC C" |
| "%s Documents" | "ABC Corp." | "ABC Corp. Documents" |

Possible values
   (Any valid C printf ( ) formatting string.)
See also
   align, width
match
The 'match' attribute specifies a value which the RAL processor will compare to the evaluated result from the 'name' attribute. If the two values match exactly, then the output from the current element will be the string specified by the 'true' attribute, otherwise the output will be the string specified by the 'false' attribute. Some examples are:

| Match | True | False | Element Value | Output |
|---|---|---|---|---|
| "1" | "Synopsis" | "" | "0" | "" |
| "1" | "Synopsis" | "" | "1" | "Synopsis" |

Possible values
   (Any valid string. Use "" for an empty string.)
See Also
   true, false, name name The 'name' attribute specifies a data field to be used as the output for the current element. The data field name given as the value for this attribute is the name of a field in a research document description, a contributor description, an industry description, or a stock symbol description. A list of data fields supported is given in the "Data Fields" sections below.

The field name can also specify any CGI input field (for CGI programs using RAL) by prepending an underscore character to the input field name, or it can specify any .INI file entry or environment variable by prepending a dollar sign to the entry/variable name.

Possible values (Any valid data field name, or _cgi-input-name, or $ini-entry-name, or $environment-variable-name.)

See also match, Data Fields quotes

The 'quotes' attribute indicates whether output from the current element should be surrounded by double quotes. If this attribute is set to "1", the 'width' and 'align' attributes are ignored.

Possible values

"1" to surround output by quotes

"0" to not surround output by quotes (default)

start

The 'start' attribute indicates the beginning point of a loop, with each iteration of the loop enumerating the data items specified by the value of this attribute. See the section "Data Enumeration" below for details.

Possible values documents contributorlist industrylist symbollist

See also end, Data Enumeration true

The 'true' attribute specifies a string value to be displayed as output for the current element if the evaluated value for the 'name' attribute matches the value of the 'match' attribute. This string may also use the '% s' feature described under 'format'.

Possible values (Any string. Use "" to indicate an empty string.)

See also match, false, format width

The 'width' attribute specifies a number which gives the desired width, in characters, of the output for the current element. If the currently evaluated output is shorter than the 'width' value, then the output is padded with spaces on the left, right, or both, according to the value of the 'align' attribute. If the output is longer than the 'width' attribute, the output is truncated on the right, and the last three characters are replaced with periods (' . . . ') to indicate a truncated value.

Possible values (Any valid integer.)

See also align

Data Enumeration

The RAL attributes 'start' and 'end' are used to mark elements that are to be repeated during the enumeration of data objects. For example, {mx start=documents}{mx name=headline}

{mx end=documents} would cause RAL to enumerate all documents that match the current query, outputting the headline of each one. (By placing the 'end' element on the next line, it also causes the headlines to be separated by an end-of-line character). The available enumerations are listed below. All enumerations are filtered so as only to include documents the user that is making the enumeration is authorized to access. That is, not all users see the same results when making enumerations, according to their level of authorization.

documents

The 'documents' enumeration loops through the result set of a query on the database of research documents. In the current implementation, the input parameters to the query are taken from CGI input items from an HTML page. They are:

daterange: An integer from 0 to 12 specifying a date range for the release date of a document.

The possible values are:

| | |
|---|---|
| 0 | Today |
| 1 | Last 2 Days |
| 2 | ThisWeek |
| 3 | Last 7 Days |
| 5 | Last 14 Days |
| 7 | This Month |
| 8 | Last 30 Days |
| 10 | All Dates |
| 12 | Last 60 Days |
| 13 | Last 90 Days | ticker: A field for ticker symbols.

query: A field for "free text" for searches of the document text. Logical expressions can be used.

contributors: A list of contributor ID numbers which identify the contributors.

industries: A list of industry ID numbers relating to the document.

The following fields are available within a 'documents' enumeration, listed with the data they output:

| | |
|---|---|
| Analysts | Names of the analysts that compiled the document. |
| AnalystIDs | Numeric ID's of the analysts that compiled the document. |
| ByteCount | Size of the document (in PDF form) in kilobytes or megabytes. |
| Contributor | Name of the company that compiled the document. |
| ContributorID | Numeric ID of the company that compiled the document. |
| DocID | The internal system document ID number. |
| DocType | 'R' for a research document; 'M' for a morning call note; 'N' for a news document. |
| Headline | The headline of the document. The system of the representative embodiment also surrounds the output from a element that displays this field with an HTML "anchor" to a CGI that downloads the PDF file for the document, or generates an HTML page for documents with no PDF form. |
| PageCount | The number of pages in the document. |
| ReleaseDate | The official release date of the document. |
| Relevance | A number from 0 to 1000 that indicates the relevance of the document to the free text that was used in the query. The higher the number, the more matches on the free text. |
| SubmitDate | The date the document was submitted by the contributing company to the repository server 2. |
| Symbols | A list of ticker symbols that the contributor listed as relevant in the document. |
| Synopsis | A "1"/"0" flag that indicates whether a synopsis is available for the document. By default, the value "Yes" |

-continued

> is output if the synopsis is available, and ""
> is output otherwise. The representative embodiment
> also surrounds the output from a element that displays
> this field with an HTML "anchor" to a CGI that
> creates an HTML page with the actual synopsis text.

The following fields are available outside a 'documents' enumeration, since they are summary information or status information. Their values depend on the same query used within a 'documents' enumeration:

ChangeViewHode

Generates text that can be used within a button to change the mode used to display documents. When the current view mode is set to show all documents, this data field generates "View Last ###", where ### is equivalent to the "Maximum" data field. When the current view mode is not set to show all documents, this data field generates "View All ###", where ### is equivalent to the "Total" data field. This text can be used as the value of a 'submit' button in HTML, and a CGI can perform the appropriate action to change display modes.

ContributorFilter

Displays the name of the current contributor being used to filter documents.

ContributorsText

Displays the names of all contributors whose codes appear in the _contributors field.

Count

Displays the total number of documents actually retrieved by a query, as opposed the number of documents that actually match the query. When the view mode is set to show all documents, this field is equivalent to the "Total" data field. Otherwise, it is equivalent to the "Maximum" data field.

CountFilter

Displays the number of documents that match the current document type and contributor filter.

DocsShown

Generates variable text, depending on the view mode (all documents, or the limited (100) set). If the view mode is set to return all documents, this data field generates the text "### Entries", where ### is equivalent to the "Count" data field. If the view mode is not set to view all entries, the data field generates the text "Last ### of * Entries", where ### is again equivalent to the "Count" data field, and * is equivalent to the "Total" data field.

DocTypeFilter

Generates the text "Research", "Morning Call Notes", or "News", depending on the current value of the document type filter.

IndustriesText

Displays the names of all industries whose codes appear in the _industries field.

Maximum

This data field is the limit on the number of documents to be retrieved when the view mode is not set to show all documents. In the representative embodiment, this value is 100 by default, or the value specified in the "MaxRows" entry in WEBPUBL.INI.

MaxRows

If the view mode is set to show all documents, this data field is equivalent to the "Total" field. Otherwise, it is equivalent to the "Maximum" field.

MorningNotes

This data field is the number of morning call notes attributed to the current contributor specified in the contributor filter.

News

This data field is the number of news stories attributed to the current contributor specified in the contributor filter.

Research

This data field is the number of research documents attributed to the current contributor specified in the contributor filter.

Total

This data field is the total number of documents that match the current query parameters, regardless of view mode, contributor filter, or document type filter.

Viewmode

This data field generates "all" if the current view mode is set to view all documents that match a query. This field generates "last" if the current view mode is set to view only the last N documents that match a query, where N is equivalent to the "Maximum" data field.

contributors

The 'contributors' enumerations is the same as a 'documents' enumeration, except that the documents are grouped by their contributors. The only fields that can be displayed are the contributor names, and the number of documents in the research and morning notes categories. This enumeration is used primarily for presenting document summaries by contributor to the users.

The following fields are available within a 'documents' enumeration, listed with the data they output:

Contributor

Names of the contributor in a group.

MorningNotes

The number of morning notes submitted by the contributor.

Research

The number of research documents submitted by the contributor.

contributorlist

The 'contributorlist' enumeration loops through the list of contributors from whom documents are available. This list is not based upon any query parameters—if a user is entitled to see the documents of a particular contributor, the contributor's name is returned in the result set.

The following data fields are available within a 'contributorlist' enumeration:

ContributorID

An integer that identifies a contributor uniquely.

ContributorName, or Contributor

The name of the contributor. The following data fields are available after a 'contributorlist' enumeration.

ContributorCount

The total number of contributors in the 'contributorlist' enumeration.

industrylist

The 'industrylist' enumeration loops through the list of industries about which documents may be compiled. There are no query parameters for the industry list. The following data fields are available within a 'industrylist' enumeration.

IndustryID

An integer that identifies an industry uniquely.

IndustryName

The name of the industry.

symbollist

The 'symbol list' enumeration loops through all ticker symbols/company names that match a given input string. In the representative embodiment, the input string is taken from the CGI input item named 'company'. If a company name contains the input string, the ticker symbol/company name is included in the result set for enumeration.

The following data fields are available within a 'symbol-list' enumeration.
SymbolID
The stock ticker symbol recognized for a company on the stock market exchange where it trades.
SymbolName
The name of the company.
Program Control
RAL allows logical control over its output. The -if, -endif, and -defer allow a template to make decisions about output based on run time values of CGI input variables, environment or .INI variables, and the values of data fields from enumerations. If a -if element evaluates to FALSE, then all text and elements between the starting -if element and its terminating -endif element will not be passed through to output. If a -defer element is used inside a regular RAL element, then the rest of the element is not evaluated, and is simply passed through to output, without the -defer element. This allows a template to evaluate some RAL elements, and leave others to be evaluated later, if the output is used as a template itself.

```
-if and -endif Usage
{mx -if <expression> }
...
{mx -endif}
where
expression = <value> <operator> <value>
value      = <string> | <number> | <variable>
operator   = == | < | > | != | <= | >=
string     = <double-quote> [<any-characters>]+ <double-quote>
number     := <digit>*
variable   := [_|$]<alphabetic character>[<alphanumeric characters>]+
```

Only one expression is allowed. A variable that does not evaluate to a known value will be treated as if it were a string. If a variable is preceded by an underscore ("_"), its value is taken from a CGI input variable with that name, minus the underscore. If a variable is preceded by a dollar sign ("$"), its value is taken from the environment variable or from the program's .INI entry which matches the variable name, minus the dollar sign.

The following example shows how the -if element can be used to display some text and values only if there are actually some morning notes in the result of the query.

```
{mx -if morningnotes != 0}
There are {mx name=morningnotes} -- Click the "AM Notes" button to
access them. <BR>
{mx -endif}
```

The following example shows how a CGI input variable can influence the output. In this example, if the "contributors" CGI form variable is not empty, then some text will be output, along with a built-in field that displays the names of all the contributors whose ID codes are in the "contributors" CGI form variable.

```
{mx -if_contributors != ""}
Query on contributors {mx name=contributorstext}
{mx -endif}
```

-defer Usage
The -defer element is simply a modifier for other elements. It keeps the RAL from evaluating an element immediately, and outputs the element as if it were plain text, except it leaves the -defer out. For example:

<option value=100{mx -defer name=_contributors match=100 true=selected}>Selection Item 100
will output
<option value=100{mx name=_contributors match=100 true=selected}>Selection Item 100
the first time it is processed. When processed again:
<option value=100selected>Selection Item 100
(This may leave the "selected" out, depending on the value of _contributors.)

One can have as many -defers as desired in an element— they do accumulate. That is, having three -defers in an element will cause it to defer evaluation until the fourth processing.

An Example Use of RAL
The following is an example of RAL used within an HTML file. A web CGI program that processes RAL can use this example file as a template, and fill in the RAL elements with the derived values of a query. This HTML has been simplified for the purpose of explanation, with comments in italics.

```
<HTML>

<HEAD>
<TITLE>
Bulletin Board
</TITLE>
</HEAD>

<BODY>
<h2><i>Bulletin Board</h2></i>

<form method="POST" action="/CGIBIN/result.exe">
<input type="submit" name="subaction" value="Refresh">
<input type="submit" name="subaction" value="Query">
<input type="submit" name="subaction" value="Summary">
<input type="submit" name="subaction" value="AM Notes">

Compare the total matching records to the maximum allowed in the
display. If there are more, show the "change viewing mode" button.
{mx -if total > maximum}
    <input type="submit" name="subaction" value="{mx
name=changeviewmode}">
{mx -endif}
<input type="submit" "name="subaction" value="Long Form">
<input type="hidden" "name="current" value="bboard"><br>

Display the total number of documents that matched, and how many
will be displayed in this list.
<b>{mx name=docsshown}</b><br>
</form>
<PRE>
<B>Submit Company      Pgs Size Symbol     Syn Headline
    </B>
<HR>

This part is a document enumeration. The enumeration shows the fields
named 'updatedate', 'contributor', 'pagecount', 'bytecount',
'symbols', 'synopsis', and 'headline'. Around the 'synopsis' field,
there is a use of the -if element, which decides whether to output a
hypertext links to the synopsis. There is no -if element for the </A>,
because an extra one doesn't hurt most browsers.
(The following lines are split up with newlines to make it easier to read
-- running this HTML, it will not give the desired results.)
{mx start=documents}
{mx name=updatedate width=7}
{mx name=contributor width=20}
{mx name=pagecount width=3 align=right}
{mx name=bytecount width=4 align=right}
{mx -if synopsis == 1}
    <A HREF="result.exe?subaction={mx name=synfile}">
{mx -endif}
{mx name=synopsis width=3}</A>
<A HREF="result.exe?subaction={mx name=docfile}">{mx
name=headline}</A>
```

-continued

```
{mx end=documents}</PRE>
<b>

Display the final counts.
{mx name=research} Research Documents<br>
{mx name=morningnotes} Morning Notes
{mx -if morningnotes > 0}
-- Click the "AM Notes" button to access them.
{mx -endif}
<br>
</b>

If there were more than a screenful of headlines displayed,
create another form and display the control buttons again,
just for the user's convenience.
{mx -if research > 17}
<hr>
<form method="POST" action="/CGIBIN/result.exe">
<input type="submit" name="subaction" value="Refresh">
<input type="submit" name="subaction" value="Query">
<input type="submit" name="subaction" value="Summary">
<input type="submit" name="subaction" value="AM Notes">
{mx -if total > maximum}
    <input type="submit" name="subaction" value="{mx
name=changeviewmode}">
{mx -endif}
<input type="submit" name="subaction" value="Long Form">
<input type="hidden" name="current" value="bboard">
</form>
{mx -endif}
</BODY>
</HTML>
```

It will be appreciated that the templates and research access program described above are of general application, and can easily be modified to be used in many applications and fields. Accordingly, the templates and research access language should be understood as applicable to applications and fields other than for the distribution of research reports.

Step-by-Step Examples

The following are three step-by-step examples illustrating some of the principles discussed above. The first example describes what happens when the user first "logs in" from a non-secure "home pages" on the WWW, and receives a Bulletin Board display. The second example shows what happens when the user selects the "Query" button that is on the Bulletin Board display from the previous example. The third example illustrates what happens when the user makes a query.

According to the representative embodiment of the present invention, there are a number of predetermined types of information displays available. A bulletin board display outputs a list of the headlines of reports that have recently been received by the repository server 2. (In these examples, "recently received" is defined to mean reports that have been received that day, e.g., since midnight on today's date.). The bulletin board display can include the time of submission of the report by the contributor, the identity of the contributor, the number of pages and size of the report, ticket symbols related to the report, whether a synopsis is available and the headline, all displayed one line per report. A query results display comprises the same fields of information, but for reports that satisfy a user's query. Each of the above two types of output can be displayed in other formats, e.g., in long form which includes a two or more line output for each report listing the headline, the time of submission of the report by the contributor, the identity of the contributor (company), the name(s) of the authors of the report, the number of pages and size of the report, ticket symbols related to the report, whether a synopsis is available. A summary display outputs a three column table, each row listing a contributor, the number of research documents at the repository server 2 available for that user from that contributor and the number of morning notes at the repository server 2 available for that user from that contributor.

EXAMPLE 1

Logging In, and Getting a Bulletin Board

If a user has accessed an initial non-secure home page of the present invention, the user can select a link to "Log In". The actual link is to an address "/SCGIBIN/result.exe", where "result.exe" is the name of the CGI program that generates response pages to user actions. The directory /SCGIBIN is actually mapped on the non-secure web server to the directory /CGIBIN on the secure web server 4. This means that home pages are handled by the non-secure server, but actual access to reports is handled by the secure web server 4. When the secure web server 4 receives the request to run "result.exe", the web server 4 first checks the request to ensure that the Internet browser making the request is authorized to access the web server 4. If the Internet browser is not authorized, the web server 4 prompts the Internet browser to ask the user, via a dialog box, for a valid user ID and password.

In this example, the user enters the name "george@1984", and the password "wombat" and then selects OK. The web server 4 now verifies that the user is authorized. This is done by passing control to a subroutine named "mxp_auth( )" which consults the relational database's 11 list of valid users and their passwords. (In this example, the relational database 11 is an SQL server.) If the given user ID and password matches a database entry, the subroutine sets up the environment variables HTTP_CID as "1984" to represent the company ID of the user (taken from the "@1984" part of his ID), HTTP_UID as "2096" to represent the user's internal ID (taken from the SQL sever's records), and HTTP_MXP as "wombat" to represent the user's password. The subroutine then returns a REQ_PROCEED value, and the web server 4 knows it may then proceed handling the user's request to run "result.exe".

The web server 4 next executes the program "result.exe", with no additional arguments, because none were specified in the hypertext link to it, and because the page that the request was made from was not an HTML form, which would have named data fields the user could fill in to modify the request. First, "result.exe" verifies that the user is not attempting access with the same ID that another user is using. So "result.exe" retrieves the value of the environment variable "HTTP_COOKIE" which is provided by the web server 4 (from the HTTP "Cookie" value in the request from the Internet browser). "result.exe" attempts to find a value in the cookie named "mxauth". Since, in this example, this is the first time this user/browser has "logged in", the "mxauth" value in the cookie has not been set, so "result.exe" grants this user access, generates an authorization string for this user, stores the string where it can find it later, and outputs a cookie value to the web server 4 that the server will send back to the Internet browser.

Next, "result.exe" determines what type of request the user made when calling "result.exe". Since there are no arguments to "result.exe", and there are no HTML form values, "result.exe" defaults to generating a Bulletin Board, which is a list of all headlines that have newly arrived at the repository server 2 today. The program has a choice of which type of database server to query for the list—the SQL server 11, and the full-text search server 13. Since this request does not require any full-text searching for values in documents, the "results.exe" program chooses to contact an SQL server 11. If the connection fails for some reason, the program will attempt to contact each backup SQL server until there are no more to connect to. The program will then fall back to attempting to contacting the full-text search servers 13 until it finds one that is up. Failure to find any available servers will result in generation of an error message, and termination of the program.

For the sake of this example, we will assume that "result.exe" successfully connected to the SQL server 11. This particular request would have no parameters, except for specifying that documents that have arrived on the SQL server 11 since midnight are desired. The request for the document headlines is immediately submitted to the SQL server 11, which returns its results asynchronously. This allows the SQL server 11 to begin processing the request, while "result.exe" moves on to its next step.

In one embodiment, the SQL server operates in conformance with a "roll back" feature. In particular, the web server 4 transmits to the SQL server a parameter specifying a minimum number of headlines (obtained from the WEBPUBL.INI file), along with the request. If, for example, the request for "all headlines that have newly arrived" results in a number of headlines which is less than the minimum number specified, the SQL server will search, backward in time, for further headlines so as to meet the minimum number of headlines requirement.

The next step for the web server 4 is to open an HTML template that is appropriate to the output requested by the user. In this case, "result.exe" is generating a simple Bulletin Board, so it is programmed to select a template named "BBOARDR?.tpl". The question mark in the name is filled in by the format that the user prefers his headlines to be displayed in. Possible formats are double line output (?='D'), list output (?='L'), and table output (?='T'). The formats that each user prefers are stored in the same place that the user's authorization code for the cookie is stored. The "result.exe" program goes to that storage area, looks up the preferred format for "george@1984", discovers it is "L", and finishes its template selection by opening the file "BBOARDRL.TPL". (Of course, other possible formats could be specified and used.)

The template file is mostly HTML, with some RAL elements mixed into it. The "result.exe" program will read through this template, and will immediately output any straight HTML to standard output, which the web server 4 will then send on to the Internet browser for the Internet browser to display as a page on the screen of the user's user computer 6, 8. However, the RAL elements will cause "result.exe" to insert various pieces of information into this stream of output at appropriate places, formatted according to the contents of the element. Shown below is an annotated "BBOARDRL.TPL", indicating in italics what happens at certain RAL elements. (Note that, as above, elements begin with the characters "{mx".)

65

*The next line allows templates to be included, to organize templates so that redundant text is not placed everywhere*

66

{mx include=httphdr}

*This is the contents of httphdr, RAL allows the setting of the http headers*
Content-type: text/html

Pragma: no-cache
XExpires: Tue, 15 Apr 1997 12:00:00 GMT

*Ral outputs internal variables (like the cookie value) in this way. Internal variables begin with a "\_" and are values that are supplied to "result.exe" via the webserver form variables. Variables from the INI file WEBPUBL.INI begin with a "$". Variables from objects (like query results, are just normal names)*

{mx name=_setcookie}

*To assign values to variables, the following construct is used. Thus the variable title is set the INI value of BulletinBoard.*

{mx name=title assign=$Bulletin_Board}

*RAL conditional logic is formed as shown below. The code below determines the value of the variable title2 which will be used to set the title of the HTML later*

```
{mx if _doctype == "M"}
   {mx name=title2 assign=$Morning_Notes}
{mx else}
{mx if _doctype == "R"}
   {mx name=title2 assign="Research"}
{mx else}
   {mx name=title2 assign="Summary"}
{mx endif}
{mx endif}

{mx name=help assign="#Bulletin Board"}
{mx name=navpos assign=$NavigPos}
```

*The header include file ahndles setting up*
{mx include=header}
<HTML>

<!-- Header -->

67

```
     <a name="Top">
     <HEAD>
     <!-- Result V. {mx name=app.version} -->
 5   <TITLE>
     {mx name=$WindowTitle} {mx name=_title} {mx name=_title2}
     </TITLE>
     <!-- <base target="_top"> -->
     </HEAD>
10   </a>
     <!-- Body. White background. -->

<BODY BGCOLOR="{mx name=$BGColor}" link="{mx
     name=$LinkColor}" vlink="{mx name=$VLinkColor}">
15
     <!-- Top of page. Graphic, navigation, and title. -->

<nobr>
     {mx if $ChipImg != "none"}{mx if $MultexHomeRef != "none"}<A
20   HREF="{mx name=$MultexHomeRef}">{mx endif}<IMG SRC="{mx
     name=$ChipImg}" BORDER=0 ALT="Powered by MultexNET"
     ALIGN=RIGHT></A>{mx endif}
     {mx if _title != "New Features"}
     {mx if $NewImg != "none"}
25   <A HREF="{mx name=app.scriptname}?current={mx name=_current
     format=CGIARG}&subaction=newfeat&{mx include=args}">
     <IMG SRC="{mx name=$NewImg}" BORDER=0 ALT="New Features"
     ALIGN=RIGHT>
     </A>
30   {mx endif}
     {mx endif}
     {mx if $HomeImg != "none"}<A HREF="{mx name=$HomeRef}"><IMG
     SRC="{mx name=$HomeImg}" BORDER=0 ALT="Home"></A>{mx
     endif}
35   {mx if $FeedBackImg != "none"}<A HREF="{mx
     name=$FeedbackRef}"><IMG SRC="{mx name=$FeedBackImg}"
     BORDER=0 ALT="Comments"></A>{mx endif}
     {mx if $HelpImg != "none"}<A HREF="{mx name=$HelpRef}{mx
     name=_help}"><IMG SRC="{mx name=$HelpImg}" BORDER=0
40   ALT="Quick Guide"></A>{mx endif}
     {mx if $LogoImg != "none"}<br>
     <A HREF="{mx name=$HomeRef}"><IMG SRC="{mx name=$LogoImg}"
     BORDER=0 ALT="MultexNET"></A>{mx endif}
```

68

```
<i><b><font size={mx name=$HeaderFontSize}>
{mx name=$System} {mx name=_title} {mx name=_title2}
</i></b></font>
{mx if $Logo2Img != "none"}{mx if $Logo2Ref != ""}<A HREF="{mx
name=$Logo2Ref}">{mx endif}<IMG SRC="{mx name=$Logo2Img}"
BORDER=0 ALT="MultexNET"></A>{mx endif}{mx if $Logo3Img !=
"none"}{mx if $Logo3Ref != ""}<A HREF="{mx name=$Logo3Ref}">{mx
endif}<IMG SRC="{mx name=$Logo3Img}" BORDER=0
ALT="MultexNET"></A>{mx endif}{mx if $Logo4Img != "none"}{mx if
$Logo4Ref != ""}<A HREF="{mx name=$Logo4Ref}">{mx endif}<IMG
SRC="{mx name=$Logo4Img}" BORDER=0
ALT="MultexNET"></A>{mx endif}
</nobr>
<br>
{mx if $PostImg != "none"}<IMG SRC="{mx name=$PostImg}"
BORDER=0 ALT="MultexNET">{mx endif}

{mx if _navpos == ""}
```

*The navig.tpl template handles the form buttons (Search, Bulletin Board, Profile, etc.) on the page.*

```
{mx include=navig}
        <!-- More navigation within MultexNET -->
        {mx if $SearchImg != "none"}
        {mx if _current != "query"}
        <a href="{mx name=app.scriptname}?current={mx name=_current
        format=CGIARG}&subaction=query">
        <img src="{mx name=$SearchImg}" border=0 alt="Search"></a>
        {mx endif}
        {mx endif}
        {mx if $BBoardImg != "none"}
        <a href="{mx name=app.scriptname}?current={mx name=_current
        format=CGIARG}&subaction=bboard">
        <img src="{mx name=$BBoardImg}" border=0 alt="{mx
        name=$Bulletin_Board}"></a>
        {mx endif}
        {mx if $DisableProfiles != "Yes"}
        {mx if $ProfilesImg != "none"}
        {mx if _current != "profiles"}
        <a href="{mx name=app.scriptname}?current={mx name=_current
        format=CGIARG}&subaction=profiles">
        <img src="{mx name=$ProfilesImg}" border=0 alt="Profiles"></a>
```

69

```
{mx endif}
{mx endif}
{mx if $PortfoliosImg != "none"}
{mx if _current != "portfolios"}
<a href="{mx name=app.scriptname}?current={mx name=_current
format=CGIARG}&subaction=portfolios">
<img src="{mx name=$PortfoliosImg}" border=0
alt="Portfolios"></a>
{mx endif}
{mx endif}
{mx if $AlertsImg != "none"}
{mx if _current != "alerts"}
<a href="{mx name=app.scriptname}?current={mx name=_current
format=CGIARG}&subaction=alerts">
<img src="{mx name=$AlertsImg}" border=0 alt="Alerts"></a>
{mx endif}
{mx endif}
{mx endif}
{mx if $PreferencesImg != "none"}
{mx if _current != "preferences"}
<a href="{mx name=app.scriptname}?current={mx name=_current
format=CGIARG}&subaction=preferences&{mx include=args}">
<img src="{mx name=$PreferencesImg}" border=0
alt="Preferences"></a>
{mx endif}
{mx endif}
{mx if $QuotesImg != "none"}
{mx if _current != "quotes"}
<a href="{mx name=app.scriptname}?current={mx name=_current
format=CGIARG}&subaction=quotes">
<img src="{mx name=$QuotesImg}" border=0 alt="Quotes"></a>
{mx endif}
{mx endif}
{mx if $FilingsImg != "none"}
<a href="{mx name=app.scriptname}?current={mx name=_current
format=CGIARG}&subaction=filings">
<img src="{mx name=$FilingsImg}" border=0 alt="SEC
Filings"></a>
{mx endif}
{mx if $AnnualRptImg != "none"}
<a href="{mx name=app.scriptname}?current={mx name=_current
format=CGIARG}&subaction=irin">
<img src="{mx name=$AnnualRptImg}" border=0 alt="Annual
```

70

```
                    Reports"></a>
                    {mx endif}
                    <br>
              {mx endif}
5       {mx include=ppvnote} //not shown
```

*This RAL command beings the query for a bulletin board. The bulletin board can be fileter by doctype and contributors. It can also rollback as described previously*

```
10
        {mx name=query init
              summary="true"
              date=-1
              contributors=_contributors
15            doctype=_doctype
              rollback=_rollback
        }

<!-- Beginning of the FORM -->
20
        <form method="POST" action="{mx name=app.scriptname}">

<!-- Action buttons -->

25          The template file bboardsb handles form fields

{mx include=bboardsb}

This is the fields to handle executing profiles
30
            {mx include=profrun}
                    {mx if $DisableProfiles != "Yes" }
                    {mx name=profile init which="profile,portfolio"}
                    {mx if profile.count != 0}
35                  <table align=right><tr><td>
                    <b>Profiles:</b><select name=run>
                    <OPTION VALUE=-1>(None Selected)
                    {mx while profile.id != ""}
                    <OPTION VALUE={mx name=profile.id match=_profile true="%s
40                  selected" false="%s"}>{mx name=profile.name}
                    {mx name=profile next}
                    {mx wend}
                    </select>
```

71

```
                <input type="submit" name="subaction" value="Run">
                </td></tr></table>
                {mx endif}
                {mx endif}
5
        <input type="submit" name="subaction" value="Refresh">
        <br>
```

*These are the fields to remember the state of the form (allow the back mecahism
10   to retrurn to the proper screen)*

```
        {mx include=state}
                <input type="hidden" name="current" value="{mx
                name=_current}">
15              <input type="hidden" name="previous" value="{mx
                name=_previous}">
                <input type="hidden" name="previous2" value="{mx
                name=_previous2}">

20      <input type="hidden" name="rollback" value="{mx name=_rollback}">

<!-- Alternate navigation location -->

{mx if _navpos == 1}
25      {mx include=navig}
        {mx endif}

<!-- Show the number of documents -->

30      <nobr>
        <b>
```

*The following RAL line handles either outputing the total number of documetns or 100
out of the total number of documents*
35

```
        {mx name=query.docsshown}<br>
        {mx include=doctype} // not shown
        </b>
        </nobr>
40
        <!-- End of form -->

</form>
```

72

*The following RAL code outputs a column heading as a HTML table*

```
     <!-- Show the returned data from the query -->
 5
     <TABLE BORDER=2>
     <TR ALIGN=CENTER>
     <TH align=left width=250>Contributor</TH>
     {mx if _doctype != "M"}
10   <TH width=170>Research</TH>
     {mx endif}
     {mx if _doctype != "R" and $DisableAMNotes != "Yes"}
     <TH width=150>{mx name=$Morning_Notes}</TH>
     {mx endif}
15   </TR>
     </TABLE>
```

*To loop through the records, the mx while construct is used. This construct allows looping through the documents. All the elements contained within the loop refer to the current objects contents. The iterator at the end of the loop retrieves the next record. Of particular interest here, is that "result.exe" will access the headline records as soon as they arrive asynchronously from the database server 11,13 displaying them as soon as they arrive. The entire result set of the query does not have to be present for the display to start, thus making the display to the user appear faster. In fact, the server is programmed to break the query to it up into pieces if sorting the results will be a lengthy process, as discussed above in the section titled "Optimizations". When the query is broken up, the most recent headlines are accessed first, which is the order that they are shown in this list. In addition, "result.exe" makes certain that the data is being sent to the server (and therefore to the user) by flushing its output queue every 5 headlines.*

```
     {mx while query.docsummary.name != ""}
     <TABLE CELLPADDING=0>
     <TR ALIGN=CENTER>
35
     <!-- Contributor name column -->

<TD ALIGN=LEFT width=250>
     {mx if query.docsummary.total != 0}
40   {mx if query.docsummary.name != "All Contributors"}
     <A HREF="{mx name=app.scriptname}?current={mx name=_current
     format=CGIARG}&subaction=bboard&doctype=&contributors={mx
     name=query.docsummary.id}&rollback={mx name=_rollback}">
```

```
                                        73
        {mx endif}
        {mx endif}
        {mx name=query.docsummary.name}
        </A>
 5      </TD>

{mx if _doctype != "M"}
          <!-- Research Documents column -->

10      <TD width=170>
           {mx if query.docsummary.research != 0 }
              {mx if query.docsummary.name != "All Contributors"}
                 <A HREF="{mx name=app.scriptname}?current={mx name=_current
        format=CGIARG}&subaction=bboard&doctype=R&contributors={mx
15      name=query.docsummary.id}&rollback={mx name=_rollback}">
              {mx endif}
           {mx endif}
           {mx name=query.docsummary.research} Research Document{mx if
        query.docsummary.research != 1}s{mx endif}
20         </A>
        </TD>
        {mx endif}

{mx if _doctype != "R" and $DisableAMNotes != "Yes"}
25         <!-- {mx name=$Morning_Notes} column -->

<TD width=150>
        {mx if query.docsummary.morningnotes != 0 }
           {mx if query.docsummary.name != "All Contributors"}
30            <A HREF="{mx name=app.scriptname}?current={mx name=_current
        format=CGIARG}&subaction=bboard&doctype=M&contributors={mx
        name=query.docsummary.id}&rollback={mx name=_rollback}">
           {mx endif}
        {mx endif}
35      {mx name=query.docsummary.morningnotes} {mx name=$Morning_Note}{mx if
        query.docsummary.morningnotes != 1}s{mx endif}
        </A>
        </TD>
        </TR>
40      {mx endif}
        </TABLE>
```

*This is the end of the while loop and the iterator to iterate through the record*

```
        {mx name=query.docsummary next}
        {mx wend}

5       The following lines output the summary and footer information. It is convenient to have
        the action buttons at the end of the long list of documents, but it looks unprofessional to
        have two sets of buttons with a short list of documents.

<P>
10      {mx if query.docsummary.count > 1}
        <b>{mx name=query.docsummary.count} Total Contributors</b>
        {mx endif}

<!-- Show the action buttons again -->
15
        {mx if query.docsummary.count > 7}

<hr>

20      <form method="POST" action="{mx name=app.scriptname}">

{mx include=bboardsb}
        <input type="hidden" name="doctype" value="{mx name=_doctype}">
        </form>
25
        {mx endif}

{mx include=footer}

30      </BODY>
        </HTML>
```

The preceding example generates a page 100 for display on the user's Internet browser at the user's user computer 6, 8 as shown in FIG. 2. (The graphic listing the service name is not shown.)

The page 100, displayed in bulletin board format, includes a number of action buttons 120–130, hyperlinks 134–144, a combo box 131, and a list of reports. The action buttons 120–130 are all used as commands to "result.exe".

Each report is listed on a single line, with information about the report including the time of submission of the report by the contributor 102, the identity of the contributor 104, the number of pages 106 and size of the report 108, ticket symbols related to the report 110, whether a synopsis is available 111 and the report's headline 112. The user can select (e.g., click on) a headline and have the complete report transferred from the repository server 2 to the user computer 6, 8. The user can select an entry in the synopsis column and have the synopsis displayed.

A refresh button 120, if selected, causes this same report to be regenerated, e.g., to include any new reports received since the this page 100 was generated. A search button 122, if selected, causes a query form to be generated, as explained in example 2 below. A summary button 124, if selected, causes a summary report to be generated. The summary report comprises a three column table, each row listing a contributor, the total number of research documents at the repository server 2 available for that user from that contributor and the total number of morning notes at the repository server 2 available for that user from that contributor. An AM Notes button 126, if selected, causes only morning notes to be displayed. A View All button 128, if selected, causes all headlines to be displayed, regardless of how many. A summary line 132 shows the total number of documents that satisfy the query (in this case, all documents that arrived at the repository server 2 since midnight) and the total number displayed.

The profile hyperlink 134 brings up a page that allows users to configure profiles. The profiles are stored queries that can be recalled at later times. The profiles are stored against the users user id so they are unique to each user.

The current list of profiles are displayed in the combo box 131. This allows the user to quickly specify a query without typing in the details every time.

The portfolio hyperlink 136 brings up the portfolio creation and execution form. Portfolios are stored queries as well, but the queries are only based on tickers and date and document type. They represent information about particular companies.

The alerts hyperlink 138 will run all portfolio and profiles, giving a summary of all new documents that have arrived that satisfies those queries.

The preferences hyperlink 140 brings a large form that allows the user to customize their environment. They can specify their E-mail address, specify which format the bulletin board is in, suppress specific contributors, etc.

The quotes hyperlink 142 simply hyperlinks to www.quote.com so the users have a convenient mechanism to obtain quotes. Similarly SEC Filings hyperlink 144 links to a web site to get SEC filings.

EXAMPLE 2

Requesting & Query Form

In the preceding example, the user "logged in" and was presented with a Bulletin Board. If the user wishes to make a query for documents that match certain criteria, he may then click the search button 122 on the Bulletin Board. This causes the Internet browser to form a request to the web server 4 to run "result.exe" again, but since the button is inside an HTML form, additional information is included in the request.

First, when the request arrives at the web server 4, the ID is verified in the same manner described in the prior example, except that the dialog box for user name and password is not displayed, since the Internet browser provides that information as part of the request. Once the user is verified, the web server 4 start running "result.exe", but with input that indicates the "Search" button was selected on the previous form.

The first thing "result.exe" does is to try to verify that the user is not attempting access with the same ID that another user is using. The "result.exe" program retrieves the value of the environment variable "HTTP_COOKIE" which is provided by the web server 2 (as received from the HTTP "Cookie" value in the request from the Internet browser). The "result.exe" program attempts to find a value in the cookie named "mxauth". Since this is NOT the first time this user/browser has logged in, the "mxauth" value in the cookie is set to the value "result.exe" gave this user last time he was authorized. The "result.exe" program compares this value to the current authorization code it has stored for this user, and if the two do not match, it generates output that tells the user that access has been denied. If the values do match, then "result.exe" proceeds.

By looking at the value for the CGI form variable "subaction", the "result.exe" program can determine that the user selected the query button 122 on his last request. At this point, the program selects an HTML template appropriate to this request, which is named "RESULTQ.TPL". To service a query form, "result.exe" connects to the appropriate database server 10, 13 as described in example one. Once connected, it then opens the HTML template, and starts generating output.

An annotated version of the "RESULTQ.TPL" template is shown below.

78

```
25    {mx include=httphdr}

{mx if _profile != ""}
      {mx name=title assign="Edit Profile"}
      {mx endif}
30    {mx if _profile == ""}
      {mx name=title assign=$SearchText}
      {mx endif}
      {mx name=help assign="#Search"}
```

79

{mx name=navpos assign=$NavigPos}

*This generates the http header required (See Example 1)*

5      {mx include=header}

*template material has bee removed that handles showing document counts, and errors in filling in the forms*
10
       <!-- Beginning of FORM -->

<form method="POST" action="{mx name=app.scriptname}">

15     <!-- Stored search name entry -->

{mx if _profile != ""}
       <table>
       <tr valign="top">
20     <td width=90><b>Profile Name:</b></td>
       <td><input type="text" name="profilename" value="{mx name=_profilename}"></td>
       {mx if $EnableEMailAlert == "Yes"}
       <td><b><input type="checkbox" name="alertemail" {mx name=_alertemail
25     match="" true="" false="checked"}>
       Notify by e-Mail when new documents match this profile</b>
       {mx endif}
       </tr>
       </table>
30     {mx endif}

<!-- Action buttons -->

*Generate the buttons for commands to be executed from this form*
35
       {mx include=resultqb}
           *Show the contents of resulttqb.tpl*

<nobr>
40         {mx if _profile != ""}
           {mx if $DisableProfileUpdate != "Yes"}
            <input type="submit" name="subaction" value="Save">
           {mx endif}

80

```
{mx endif}
<input type="submit" name="subaction" value="Submit">
<input type="submit" name="subaction" value="Count Only">
{mx if $DisableSummary != "Yes"}
 <input type="submit" name="subaction" value="Summary">
{mx endif}
{mx if _profile != ""}
<input type="reset" value="Reset">
{mx endif}
{mx if _profile == ""}
<input type="submit" name="subaction" value="Reset">
{mx if $DisableProfiles != "Yes"}
 {mx if $DisableProfileUpdate != "Yes"}
  <input type="submit" name="subaction" value="Store Search">
 {mx endif}
{mx endif}
{mx endif}
</nobr>
<br>
```

*This includes the state variables*

{mx include=state}

*This form field that is hidden, allows result.exe to remember what profile is selected. Any variable that begins with a "\_" are values given to "result.exe" via a form field. If the last form had a field (text, list box, hidden, or otherwise) named "profile" (no underscore), then the web server 4 would start this instance of "result.exe" with an input filed named "profile" whose value would be the value in the "profile" field in the last form. If the last form had a field named "profile" with a value of "IBM", then this element will generate a default value for this input field of "IBM". This allows "result.exe" to come back to the previous state of this query form, if other forms remember the value for "profile" in hidden fields.*

```
<input type="hidden" name="profile" value="{mx name=_profile}">

<nobr>

<br>
{mx if _navpos == 1}
{mx include=navig}  // see example 1 for the contents of navig.tpl
{mx endif}
```

```
                                         81

<!-- Everything else goes into tables for formatting purposes -->

{mx if $DisableAMNotes != "Yes"}
       <!-- Document type selection -->
 5
       <table>
       <tr valign="top">
       <td width=90><b>Document Type:</b>
       <td>
10     {mx include=doctype}
       </tr>
       </table>
       {mx endif}

15     <!-- Ticker symbol entry, and symbol guide button -->

<table>
       <tr valign="top">
       <td width=90><b><a name="Symbols">Symbols:</a></b></td>
20     <td>
       <input type="text" name="ticker" value="{mx  name=_newticker} {mx
       name=_ticker}">
       <td width=86>
       <td>
25     <input type="submit" name="subaction" value="Symbol Guide">
       </td>
       </tr>
       </table>
       <table>
30     <tr><td width=90>
       <td>
       <input type="checkbox" name="tickertext" {mx name=_tickertext match=""
       true="" false="checked"}>
       <b>Use symbols as keyword search also</b>
35         
       <nobr>
       <input type="checkbox" name="primary" {mx name=_primary match="" true=""
       false="checked"}>
       <b>Search for documents' primary symbol only</b></nobr>
40     </table>

<!-- Date range entry -->
```

82

```
<table>
<tr valign="top">
<td width=90><b><a name="Date">For Period Of:</a></b></td>
<td>{mx include=datecust}
```

*The datecust include file*

*The following list box has one value preselected, due to the "match" and "true" parts in the elements within it. These elements evaluate the value for the field "date" from the last form, and if the value matches the value given for the "match" part, then the displayed value for the element will be the contents of the "true" part of the element, in this case, the word "selected". In other words, for each one of these lines, you could read "If the last forms date field matches X, then display the word "selected". The special case for "Last 7 Days". Where the match value is 3, simply means that if the date value is either empty, or the number three, it is match.*

```
<select name="date">
    <option value="-1" {mx name=_date match=-1 true=selected} >New Submissions
    <option value="0" {mx name=_date match=0 true=selected} >Today
    <option value="1" {mx name=_date match=1 true=selected} >Last 2 days
    <option value="2" {mx name=_date match=2 true=selected} >This Week
    <option value="3" {mx name=_date match=3 true=selected} >Last 7 days
    <option value="5" {mx name=_date match=,5 true=selected} >Last 14 days
    <option value="7" {mx name=_date match=7 true=selected} >This Month
    <option value="8" {mx name=_date match=8 true=selected} >Last 30 days
    <option value="12" {mx name=_date match=12 true=selected} >Last 60 Days
    <option value="13" {mx name=_date match=13 true=selected} >Last 90 Days
    <option value="10" {mx name=_date match=10 true=selected} >All Dates
    <option value="11" {mx name=_date match=11 true=selected} >Custom Date
</select>

</td>
<td><b>or From
<input size=13 type="text" name="fromdate" value="{mx name=_fromdate}"> To
<input size=13 type="text" name="todate" value="{mx name=_todate}">
</b>
</td>
```

83

```
     </tr>
     </table>

<!-- Search text entry -->
 5
     <table>
     <tr>
     </tr>
     </table>
10   <table><tr valign="top"><td width=90><b><a
     name="Keywords">Keywords:</a></b></td>
```

*Here a default value for this field is based on the "query" field in the last form*

```
15   <td><input type="text" name="query" size=49 value="{mx name=_query}">
        <input type="submit" name="subaction" value="Help">
     </td></tr>
     <tr><td>
     <td>
20   <nobr><input type="radio" name="querytype" value="" {mx name=_querytype
     match="" true="checked" false=""}>
     <b>Search both</b></nobr>

<nobr><input type="radio" name="querytype" value="H" {mx name=_querytype
25   match="H" true="checked" false=""}>
     <b>Search headlines only</b></nobr>

<nobr><input type="radio" name="querytype" value="T" {mx name=_querytype
     match="T" true="checked" false=""}>
30   <b>Search document text only</b></nobr>
     </tr>
     </table>

{mx if $DisableContributorList != "Yes"}
35   {mx if $$CTBDisplay != "No"}

<!-- Contributor selection entry -->

{mx name=contributor init}
40   <table>
     <tr valign="top"><td width=90><b><a
     name="Contributors">Contributors:</a></b></td>
     <td><SELECT NAME=contributors SIZE={mx name=$$CTBSize} {mx
```

84

```
name=SSCTBMulti match="No" false="MULTIPLE"}>
{mx if SDisableCorporateRegister != "Yes"}
<OPTION VALUE="0" {mx name=_contributors match=,0 true=selected}>Multex
Corporate Register
{mx endif}
```

This is a possible default selection, the same as described for "date".

```
<OPTION VALUE="-1" {mx name=_contributors match=,-1 true=selected}>[ All
Contributors ]
```

*This element (mx while) marks the beginning of a loop on contributors. When the enclosed elements are evaluated, "result.exe" forms a query to the server that will return a list of all document contributors (companies) that this particular user is entitled to read documents from. The request is asynchronous, so as each contributor record is returned from the server, "request.exe" can fill in the inside loop. Inside the loop is an element that displays the ID number of the contributor, optionally followed by the word "selected" if it should be the default selection on this form based on prior values of the form fields "contributors". The other lists are similar.*

```
{mx while contributor.id != ""}{mx if contributor.count > 1}
<OPTION VALUE={mx name=contributor.id match=_contributors true="%s
selected" false="%s"}>{mx name=contributor.name} {mx name=contributor.isppv
match="1" true=" (S)" false=""}
{mx endif}{mx name=contributor next}{mx wend}
<OPTION >
</SELECT></td></tr>
</table>
{mx endif}
{mx endif}

{mx if SDisableAnalystList != "Yes"}
{mx if SSANADisplay != "No"}

<!-- Analyst selection entry -->

{mx name=analyst init contributors=_contributors}
<table>
{mx while analyst.id != ""}{mx if analyst.count > 1}
{mx if _anldone != "anldone"}<tr valign="top"><td width=90><b><a
name="Analysts">Analysts:</a></b></td><td><SELECT NAME=analysts
SIZE={mx name=SSANASize} {mx name=SSANAMulti match="No"
false="MULTIPLE"}><OPTION VALUE="-1" {mx name=_analysts match=,-1
```

85

```
       true=selected}>[ All Analysts ]{mx name=anldone assign="anldone"}{mx endif}
       <OPTION VALUE={mx name=analyst.id match=_analysts true="%s selected"
       false="%s"}>{mx name=analyst.name}
       {mx endif}{mx name=analyst next}{mx wend}
 5     {mx if _anldone == "anldone"}
       <OPTION >===========================================
       </SELECT>
       </td></tr>
       {mx endif}
10     </table>
       {mx endif}
       {mx endif}

{mx if SDisableIndustryList != "Yes"}
15     {mx if $$INDDisplay != "No"}

<!-- Industry selection entry -->

<table>
20     <tr valign="top"><td width=90><b><a
       name="Industries">Industries:</a></b></td>
       <td><SELECT NAME=industries SIZE={mx name=$$INDSize} {mx
       name=$$INDMulti match="No" false="MULTIPLE"}>
       <OPTION VALUE="-1" {mx name=_industries match=,-1 true=selected}>[ All
25     Industries ]
       {mx name=industry init industryset=$IndustrySet}
       {mx while industry.id != ""}
       <OPTION VALUE={mx name=industry.id match=_industries true="%s selected"
       false="%s"}>{mx name=industry.name}
30     {mx name=industry next}{mx wend}
       <OPTION >===========================================
       </SELECT>
       </td></tr>
       </table>
35     {mx endif}
       {mx endif}

{mx if SDisableSubjectList != "Yes"}
       {mx if $$SUBDisplay != "No"}
40
       <!-- Subject selection entry -->

<table>
```

86

```
     <tr valign="top"><td width=90><b><a name="Subjects">Subjects:</a></b></td>
     <td><SELECT NAME=subjects SIZE={mx name=$SSUBSize} {mx
     name=$SSUBMulti match="No" false="MULTIPLE"}>
     <OPTION VALUE="-1" {mx name=_subjects match=,-1 true=selected}>[ All
 5   Subjects ]
     {mx name=subject init subjectset=$SubjectSet}
     {mx while subject.id != ""}
     <OPTION VALUE={mx name=subject.id match=_subjects true="%s selected"
     false="%s"}>{mx name=subject.name}
10   {mx name=subject next}{mx wend}
     <OPTION >==================================================
     </SELECT>
     </td></tr>
     </table>
15   {mx endif}
     {mx endif}

{mx if $DisableCategoryList != "Yes"}
20   {mx if $$CATDisplay != "No"}

<!-- category selection entry -->

<table>
25   <tr valign="top"><td width=90><b><a
     name="Categories">Categories:</a></b></td>
     <td><SELECT NAME=categories SIZE={mx name=$SCATSize} {mx
     name=$$CATMulti match="No" false="MULTIPLE"}>
     <OPTION VALUE="-1" {mx name=_categories match=,-1 true=selected}>[ All
30   Categories ]
     {mx name=category init}
     {mx while category.id != ""}
     <OPTION VALUE={mx name=category.id match=_categories true="%s selected"
     false="%s"}>{mx name=category.name}
35   {mx name=category next}{mx wend}
     <OPTION >==================================================
     </SELECT>
     </td></tr>
     </table>
40   {mx endif}
     {mx endif}

{mx if $DisableRecurrentList != "Yes"}
```

87

```
    {mx if $$RECDisplay != "No"}

<!-- recurrent selection entry -->

5  <table>
    <tr valign="top"><td width=90><b><a name="Recurrent">Recurrent
    Types:</a></b></td>
    <td><SELECT NAME=recurrents SIZE={mx name=$$RECSize} {mx
    name=$$RECMulti match="No" false="MULTIPLE"}>
10  <OPTION VALUE="-1" {mx name=_recurrents match=,-1 true=selected}>[ All
    Recurrent Types ]
    {mx name=recurrent init}
    {mx while recurrent.id != ""}
    <OPTION VALUE={mx name=recurrent.id match=_recurrents true="%s
15  selected" false="%s"}>{mx name=recurrent.name}
    {mx name=recurrent next}{mx wend}
    <OPTION >
    </SELECT>
    </td></tr>
20  </table>
    {mx endif}
    {mx endif}

<!-- region selection entry -->
25
    <table>
    <tr>

{mx if $DisableRegionList != "Yes"}
30  {mx if $$REGDisplay != "No"}
    <td><b><a name="Regions">Regions:</a></b></td>
    {mx endif}
    {mx endif}
    {mx if $DisableCountryList != "Yes"}
35  {mx if $$COUDisplay != "No"}
    <td><b><a name="Countries">Countries:</a></b></td>
    {mx endif}
    {mx endif}
    {mx if $DisableCurrencyList != "Yes"}
40  {mx if $$CURDisplay != "No"}
    <td width=90><b><a name="Currencies">Currencies:</a></b></td>
    {mx endif}
    {mx endif}
```

```
                                            88
       </tr>

<tr>

5     {mx if $DisableRegionList != "Yes"}
       {mx if $$REGDisplay != "No"}
       <td><SELECT NAME=regions SIZE={mx name=$$REGSize} {mx
       name=$$REGMulti match="No" false="MULTIPLE"}>
       <OPTION VALUE="-1" {mx name=_regions match=,-1 true=selected}>[ All
10     Regions ]
       {mx name=region init}
       {mx while region.id != ""}
       <OPTION VALUE={mx name=region.id match=_regions true="%s selected"
       false="%s"}>{mx name=region.name}
15     {mx name=region next}{mx wend}
       </SELECT>
       </td>
       {mx endif}
       {mx endif}
20
       <!-- country selection entry -->

{mx if $DisableCountryList != "Yes"}
       {mx if $$COUDisplay != "No"}
25     <td><SELECT NAME=countries SIZE={mx name=$$COUSize} {mx
       name=$$COUMulti match="No" false="MULTIPLE"}>
       <OPTION VALUE="-1" {mx name=_countries match=,-1 true=selected}>[ All
       Countries ]
       {mx name=country init}
30     {mx while country.id != ""}
       <OPTION VALUE={mx name=country.id match=_countries true="%s selected"
       false="%s"}>{mx name=country.name}
       {mx name=country next}
       {mx wend}
35     </SELECT>
       </td>
       {mx endif}
       {mx endif}

40
       <!-- currency selection entry -->

{mx if $DisableCurrencyList != "Yes"}
```

89

```
     {mx if $$CURDisplay != "No"}
     <td><SELECT NAME=currencies SIZE={mx name=$$CURSize} {mx
     name=$$CURMulti match="No" false="MULTIPLE"}>
     <OPTION VALUE="-1" {mx name=_currencies match=,-1 true=selected}>[ All
 5   Currencies ]
     {mx name=currency init}
     {mx while currency.id != ""}
     <OPTION VALUE={mx name=currency.id match=_currencies true="%s selected"
     false="%s"}>{mx name=currency.name}
10   {mx name=currency next}{mx wend}
     </SELECT>
     </td>
     {mx endif}
     {mx endif}
15
     </tr>
     </table>

<!-- exchange selection entry -->
20
     {mx if $DisableExchangeList != "Yes"}
     {mx if $$EXCDisplay != "No"}
     <table>
     <tr valign="top"><td width=90><b><a
25   name="Exchanges">Exchanges:</a></b></td>
     <td><SELECT NAME=exchanges SIZE={mx name=$$EXCSize} {mx
     name=$$EXCMulti match="No" false="MULTIPLE"}>
     <OPTION VALUE="-1" {mx name=_exchanges match=,-1 true=selected}>[ All
     Exchanges ]
30   {mx name=exchange init}
     {mx while exchange.id != ""}
     <OPTION VALUE={mx name=exchange.id match=_exchanges true="%s selected"
     false="%s"}>{mx name=exchange.name}
     {mx name=exchange next}{mx wend}
35   <OPTION >=========================================
     </SELECT>
     </td></tr>
     </table>
     {mx endif}
40   {mx endif}

</nobr>
```

90
    <hr>

<!-- Repeat the buttons from above -->

5   *Like the bulletin board template, the buttons from above are placed at the end to aid the
    user in prevention of scrolling.*

{mx include=resultqb}
10
    <!-- End of the form -->

</form>

15  {mx include=footer}

</BODY>
    </HTML>

The preceding example generates a page 200 for display on the user's Internet browser at the user's user computer 6, 8 as shown in FIG. 3. (The graphic listing the service name is not shown.)

Using the document query page 200, the user can specify parameters for a search of reports located at the repository server 2. The user can specify one or more of the following parameters: symbol (202), period of time, from a drop down list box (204), keywords, and logical joins thereof (206), contributors (208), and industry groups (210). A symbol guide 220 is available if the user does not know a stocks ticker symbol, etc.

A partial list of the HTML generated for the contributors list box (208) is shown below:

```
<SELECT NAME=contributors SIZE=6 MULTIPLE>
<OPTION VALUE="-1" selected>[All Contributors]
<OPTION VALUE=42>Adams, Harkness & Hill
<OPTION VALUE=47>Alex Brown & Sons
<OPTION VALUE=128>Auerbach Grayson & Co., Inc.
<OPTION VALUE=53>Brown Brothers Harriman & Co.
<OPTION VALUE=109>Chicago Corporation
<OPTION VALUE=157>Closed End Fund Digest
...
...
...
<OPTION VALUE="-2">=======================
</SELECT>
```

A submit button 212 allows the user to submit the query, as discussed in detail in example three below. A count only button 214 allows the user to request a count of all documents available to that user that satisfy the query parameters. A reset button 216, if selected, clears the form. A BBoard button, if selected causes a bulletin board to be created for the user, as per the first example above.

EXAMPLE 3

The User Makes a Query

In the preceding example, the user requested a form from which he could make a query. This example will step through the user's actions, and the result it produces.

For this example, assume that the user has decided to select documents from Alex Brown & Sons, released over the last 30 days, that have the phrase "strong buy" in them. To do this, in the query form, the user selects the "Last 30 Days" item in the period of time combo box 204, enters "strong buy" (quotes included, to indicate a phrase instead of two independent words) in the keywords edit window 206, and selects "Alex Brown & Sons" in the contributors list box 208. To get the list of headlines that match this request, the user selects the submit button 212.

The request that goes to the web server 4 at this point is to run "result.exe" again, but there is additional information about date, keywords, and contributors in the request. Fields are also defined for industries and ticker symbols, but they are empty fields because the user did not specify anything for them. After the web server 4 verifies the user (as described above), it starts the "request.exe" program with these form fields as additional input.

The "request.exe" program determines from the input fields that a specific query is desired, and from the value of the "subaction" field (button 212) that the user wants a headline list, as opposed to a simple headline count, or a headline summary. The "request.exe" program selects the HTML template "RESULTRL.TPL", choosing the list format output (indicated by the "L" at the end of the file name) for just as it did for the first example. It constructs a headline query based upon the input fields for date, contributor, and keywords. It then submits the query to the full-text search server 13 (since there are keywords specified in the query). It then opens the HTML template, and fills in the elements from the result set of the query, in the same manner as for the Bulletin Board in the first example.

The resulting page 300 generated for display on the user's Internet browser at the user's user computer 6, 8 as shown in FIG. 4. (The graphic listing the service name is not shown.) The page is similar in many respects to that shown in FIG. 2. A score column 402 shows a relevancy score. The summary line 404 shows the total number of documents that satisfy the query, the total number displayed and query search parameters.

The user may then select a document by clicking on the document's headline. The document transfer process takes place as follows: The web server 4 issues a request to the relational database 11 asking whether the user is permitted to view the selected document. Assuming that the selected SQL server is available (if not, the backup procedure described above takes place), then the SQL server returns whether the use is so permitted. (Generally, access is permitted since user access rights are considered in the general query. If between the query and the request for the document those access rights change, the mechanism protects the document.) If the user is not permitted, then the web server 4 generates a HTML page using an error template. If the user is permitted, the requested document file is opened, the web server 4 generates the appropriate HTTP header and outputs it to STDOUT, and the document file is read and its contents is output to STDOUT. At the user computer 6, 8, the Internet browser program launches a helper application to allow the user to read, print and save the document.

Although the invention has been described with reference to a particular embodiment and arrangement of parts, features and the like, the above disclosure is not intended to exhaust or limit all possible embodiment, arrangements or features, and indeed, many other modifications and variations will be ascertainable to those skilled in the art.

Figure 5:
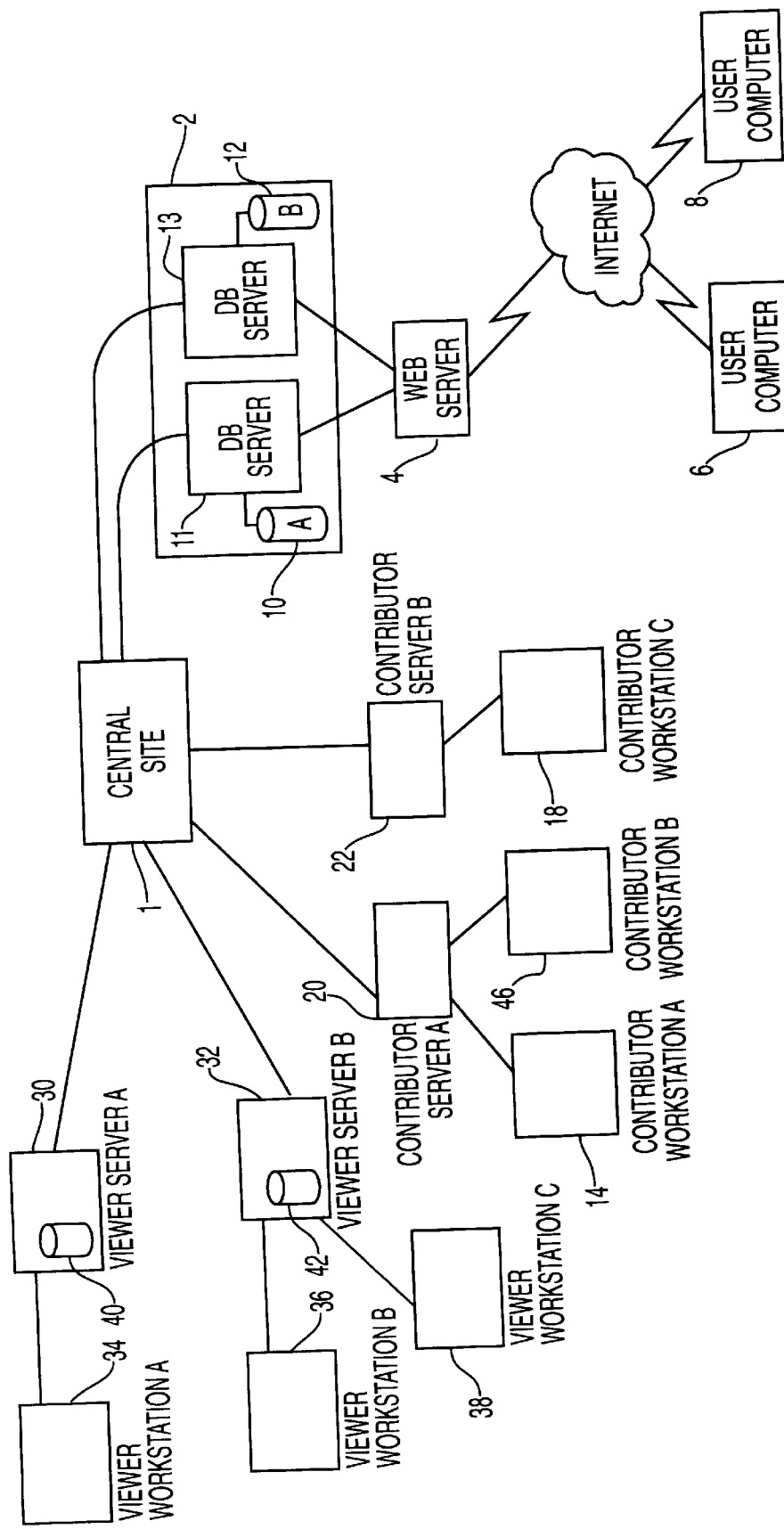
FIG. 5 is a system architecture diagram of an enhanced system according to the present invention.

For example, the central site 1 may distribute reports by other networks in addition to the Internet. FIG. 5 illustrates an enhanced system architecture according to the present invention. In the enhanced system, the central site 1 is also coupled to one or a number of viewer servers 30, 32. Typically, the viewer servers 30, 32 are located at a remote location with respect to the central site 1 and are coupled to the central site 1 over a proprietary network. Each viewer server 30, 32 includes a database 40, 42 and is coupled to one or a number of viewer workstations 34, 36, 38. The viewer workstations 34, 36 execute the Acrobat Exchange program, available from Adobe Systems, and the Multex Publisher™ Research Viewer program, by Multex Systems, Inc. The central site 1 maintains a distribution list that lists which viewer servers 30, 32 are permitted to receive reports from which contributors. (As a simple example, if viewer server A 30 is located at company ABC, Inc. and viewer server B 32 is located at company RST, Inc., then, for a particular report, the repository server may distribute the report to viewer server A 30 but not viewer server B 32.) When a report is received by the central site 1, the central site 1 transmits a task (i.e., a set of instructions for execution by the receiving server) to each viewer server 30, 32 that is permitted to receive that report that a new report has arrived. The permitted viewer server 30, 32 first enqueues the task on its respective task queue (each server has its own task queue), and then executes the task (in due course) to "pull"

that report from the central site 1 and store it in their respective databases 40, 42. The viewer server 30, 32 will then cause the title of the report to be displayed on viewer workstations 34, 36, 38 that are used by investors who are permitted (as determined by the distribution level set by the contributor). Investors can also issue queries to the viewer server's database, which will return titles of relevant reports. The investor may then request a report, which is "pulled down" from the viewer server 30, 32 to the requesting viewer workstation 34, 36, 38.

It is noted that the web server 4 and repository server 2 of the representative embodiment of the present invention can be implemented utilizing a logic circuit or a computer memory comprising encoded computer-readable instructions, such as a computer program. The functionality of the logic circuit or computer memory has been described in detail above. Generally, the present invention has practical application as it enables reports and other information to be distributed speedily and searched efficiently by authorized users in remote locations.

Entitlement/Report Subsystem

Each participating research provider ("contributor") may dynamically authorize ("entitle") and de-authorize ("disentitle") users to access selected individual documents, and document groups. Additionally, contributors may download reports regarding entitlements and document usage. In accordance with the present invention, each such capability is provided by an on-line real time entitlement/report subsystem.

Figure 6:
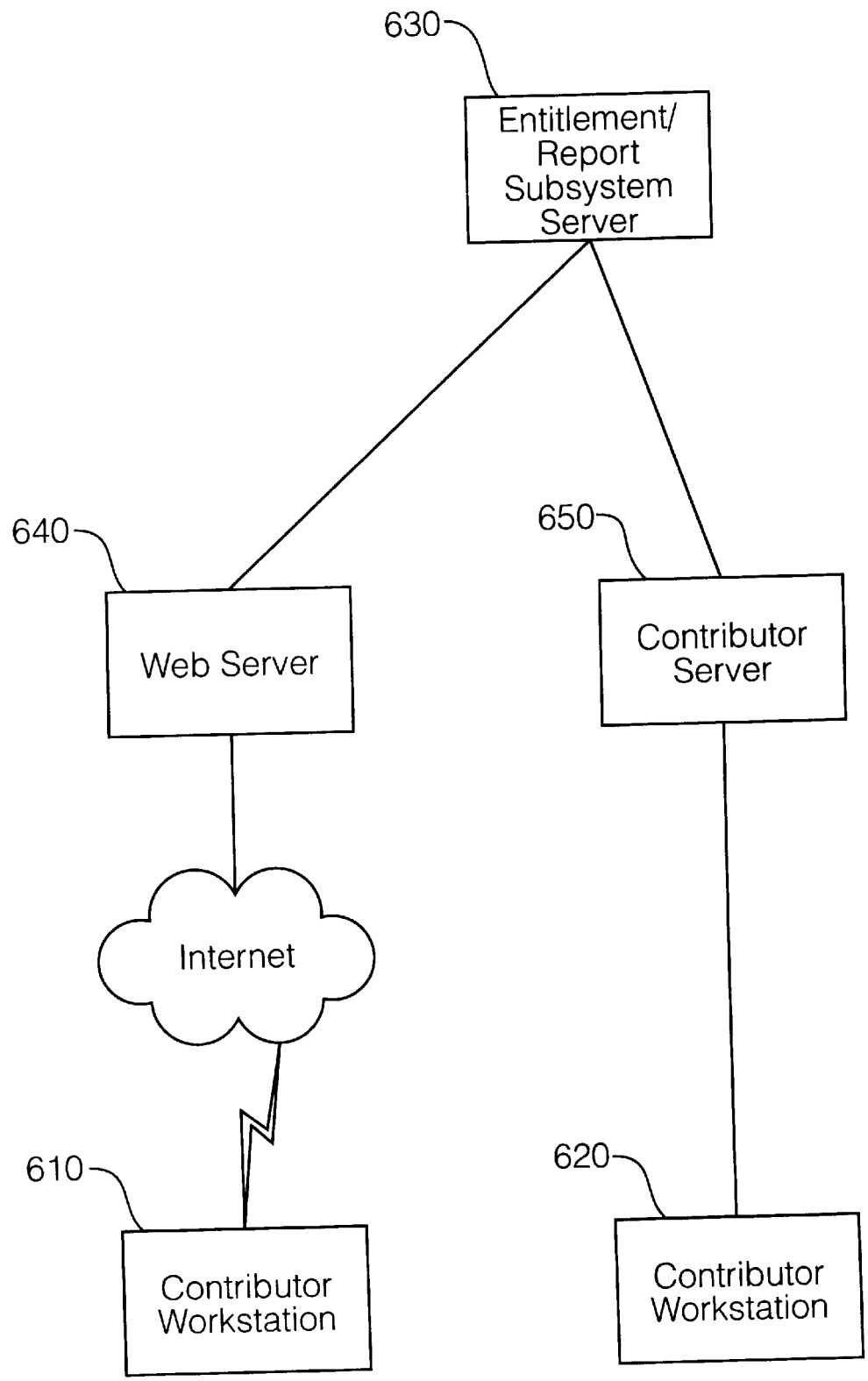
FIG. 6 illustrates one embodiment of an on-line entitlement/report subsystem.

Referring to FIG. 6, contributor workstations 610, 620 (typically located at a site remote from the repository server 2) are selectively coupled to an entitlement/report subsystem server 630 via, for example, a Web server 640 (over the Internet) or over a proprietary network through a contributor server 650. The subsystem server 630 is additionally in communication with the repository server 2 of FIGS. 1 and 5 (not shown in this figure).

Figure 7:
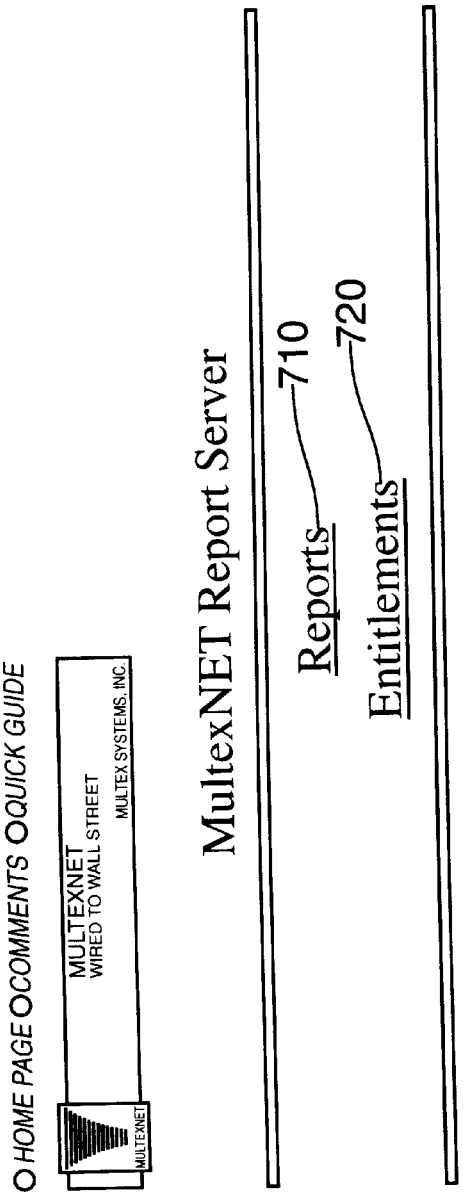
FIG. 7 is an example initial menu of the entitlement/report subsystem.

Once workstations 610, 620 are connected to the subsystem server 630, the subsystem server 630 prompts the contributors (at the corresponding workstations 610, 620) to log-in with an ID and password. In the exemplary embodiment, the ID and password are verified by the subsystem server 630 (e.g., in the manner described above in connection with user verification). After the contributor has logged in, the subsystem server 630 presents the contributor (via the Internet as a web page or via a proprietary network) with an initial menu. An example of such a menu is illustrated in FIG. 7. As shown, the contributor may chose to create a report by clicking (i.e., selecting with an input device such as a mouse) "Reports" 710 or chose to review and/or modify user (subscriber) entitlement status by clicking "Entitlements" 720.

Figure 8:
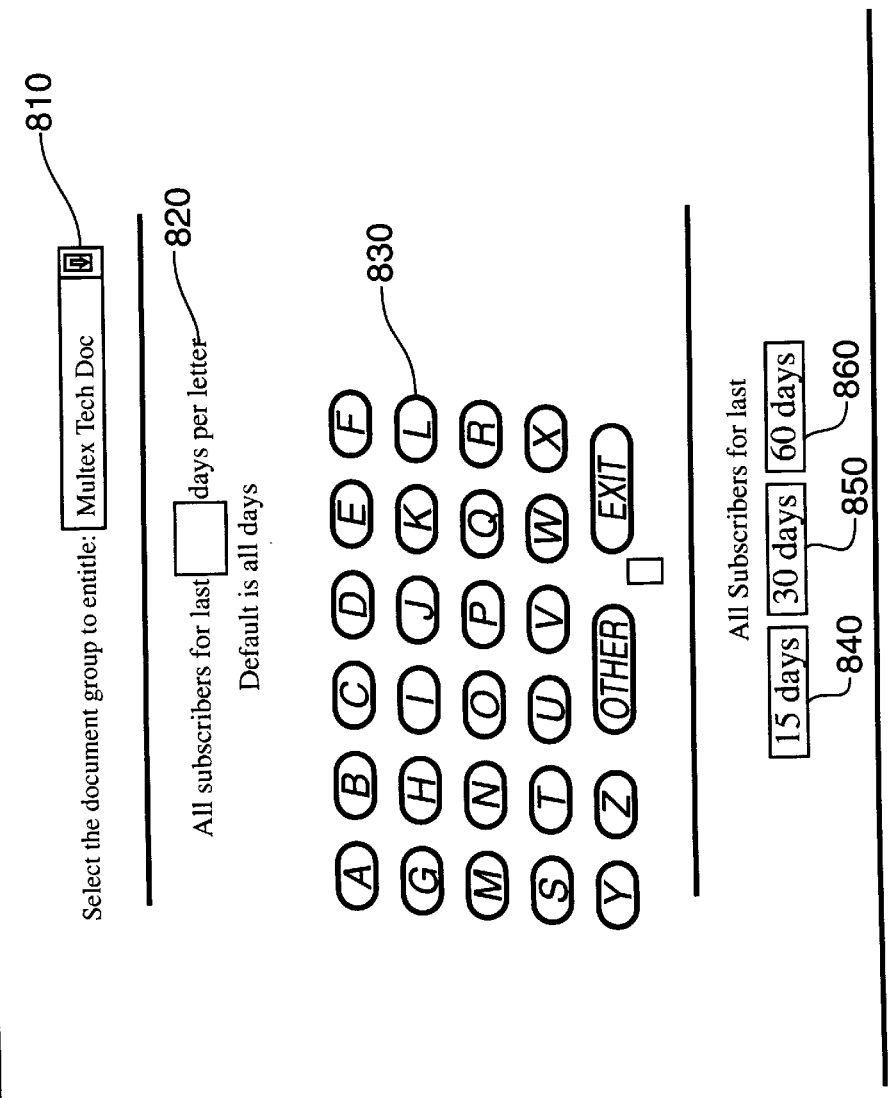
FIG. 8 is an example of a subscriber selection criteria page (for entitlement status viewing/modification).

If the contributor selects "Entitlements" 720, the subsystem server 630 presents the contributor with a selection page having a drop down box (810), an input box (820), and a number of action buttons (830–860) as illustrated in FIG. 8. Using this page, the contributor identifies to the subsystem server 630 the criteria for selecting subscribers whose entitlement status the contributor wishes to review and/or modify.

The contributor first identifies what document group (or possibly what hypertext link) the contributor wishes to work with. Clicking on button 810 causes a drop down box (not shown) to appear listing document groups (associated with that particular contributor) from which the particular contributor may chose. The list may include, for example:

Public—identifying public type documents;

Internal—identifying contributor internal documents; or

Technical—identifying technical documents.

Alternatively, the list may include individual document titles or hypertext link names. As illustrated, a document group "Multex Tech Doc" has been selected.

Next, the contributor may chose to display the entitlement status for subscribers by letter or may chose to display the status of all subscribers for the last 15 days (840), 30 days (850) or 60 days (860). Specifically, if the contributor wishes to display subscribers by letter, the contributor may, for example, display all new subscribers, i.e., new within the last N number of days (default is ALL days) whose names start with a particular letter of the alphabet. In that case, the contributor fills in the number of days (N) in the input box 820 and clicks a lettered action button 830. The contributor may click on "Other" to display subscribers whose names begin with non-alphabetic characters (such as, for example, 3Com).

Alternatively, the contributor may display all new subscribers, i.e., new within the last 15, 30, or 60 days, by clicking "15 days" 840, "30 days" 850, or "60 days" 860 (respectively).

In response to a contributor's selection of an action button (830, 840, 850, 860), the subsystem server 630 queries the repository server 2 for a list of subscribers meeting the selected criteria. The resulting list is transmitted to the subsystem server 630 for display to the contributor.

Figure 9:
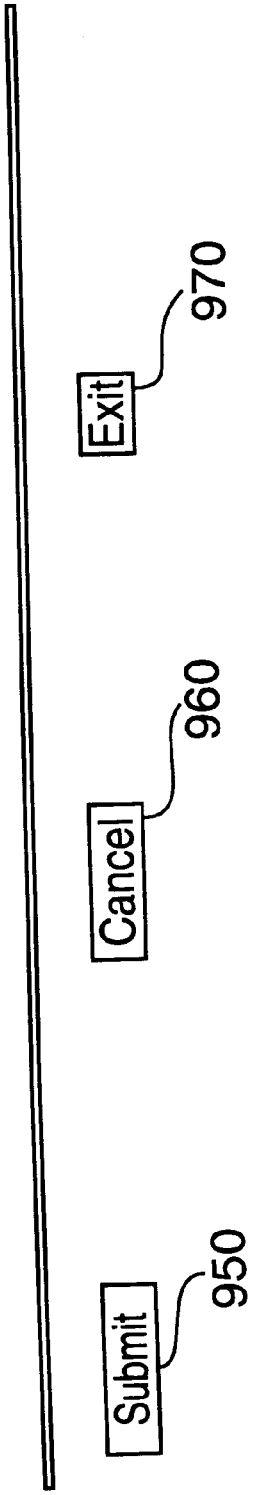
FIG. 9 is an example of an entitlement status viewing/modification page.

FIG. 9 illustrates one exemplary subscriber list. Here, the contributor selected: i)"Multex Tec Doc" document group; ii) new subscribers within the last 15 days; and iii) the letter "Z." As illustrated, information for each subscriber is listed on a single line and includes the subscriber name 910, the subscriber's city 920, and whether the subscriber is currently entitled 930 (or disentitled 940) to access documents within the selected document group (here, Multex Tec Doc group). In this case, all of the listed subscribers are "disentitled" or prohibited from accessing documents in the selected document group (the "disentitled" circle of each subscriber is filled in).

To modify entitlement status, the contributor clicks either the circle 931 below "Entitled" 930—filling in the "entitled" circle (if the subscriber is currently "disentitled") or clicks the circle 932 below "Disentitled" 940—filling in the "disentitled" circle (if the subscriber is currently "entitled") corresponding to the appropriate subscriber. The contributor submits the changes to the subsystem server 630 by clicking the "Submit" action button 950. Clicking on the "cancel" action button 960 cancels the operation. The contributor may then return to the initial menu (FIG. 7) by clicking the "exit" action button 970.

The subsystem server 630 transmits the submitted changes to the repository server 2 where the changes are processed and the authorization lists appropriately updated. In the exemplary embodiment, the submitted changes are implemented in real time. However, in an alternate embodiment, the submitted changes may be implemented in batch-mode, for example, at night.

It is contemplated that, in most cases, a particular contributor will be permitted to view and modify entitlement status only with respect to documents and document groups associated with (or contributed by) that particular contributor (during login procedures, the contributor identifies himself or herself with the ID and password). However, it is also possible that contributors will be permitted to view and modify entitlement status with respect to documents and document groups associated with related contributors or contributors who have authorized such viewing and/or modification.

Particular subscribers or subscriber groups may have a default entitlement status for particular documents or document groups. Specifically, all subscribers may initially be "entitled" to access documents within the "Public" document group. However, perhaps only contributor's employees are initially "entitled" to access the contributor's internal documents while all other subscribers may be "disentitled."

In one embodiment, contributors may set the entitlement status of subscribers to one setting for a predetermined period of time. After the expiration of that time, the entitlement status of some or all of the subscribers may automatically change. For example, a contributor may wish to initially "entitle" a small subset of subscribers—and "disentitle" everyone else—for 30 days, for a particular document or document group. The document or document group may contain information that is only sensitive for a certain length of time. After the expiration of the 30 days, however, the contributor may wish to have the entitlement status of some or all of the "disentitled" subscribers to change to "entitled."

Figure 10:
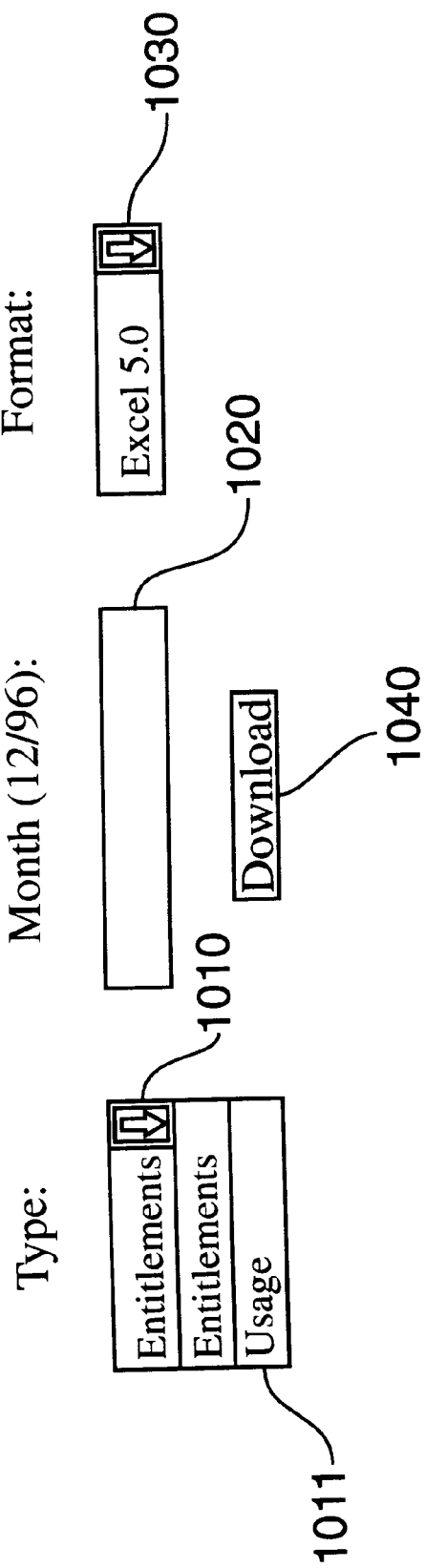
FIG. 10 is an example of an entitlement report parameter specification page.

If the contributor wishes to create and download reports, the contributor selects "Reports" 720 from the initial menu (FIG. 7). As a result of a "Reports" selection, the subsystem server 630 displays to the contributor a report parameter selection page (FIG. 10). Using this page, the contributor identifies to the subsystem server 630 the type of report, which month's data to analyze, and what format the report should be in.

As the result of selecting button 1010, a drop down box 1011 is displayed, listing the types of reports from which the contributor may chose. Here, the contributor may chose "Usage" (usage reports were described above) or "Entitlements." Other reports are, of course, possible. Entitlement reports provide information such as users/subscribers entitlement status for each document group, each individual document, and/or each hypertext link.

In this representative embodiment, the contributor also selects which month's data should be analyzed for the report by typing a month in the input box 1020. Here, if the contributor types "12/96" into the input box 1020, the data for the month of December, 1996 is analyzed.

Finally, the contributor selects the format of the report to be downloaded to the contributor's workstation 610, 620. Clicking button 1030 results in the display of a drop down box (not shown) listing the possible report formats. The formats may include, for example, Excel 5.0, WordPerfect 6.1, Microsoft Word, etc. Other report formats are possible. Here, Excel 5.0 has been selected as the report format.

The contributor submits the report parameters to the subsystem server 630 by clicking on the "Download" button. Once the subsystem server 630 receives the parameters, the subsystem server 630 transmits the parameters to repository server 2 in the form of a query. The repository server 2 processes the query and transmits the results back to the subsystem server 630 for downloading (in real time) to the contributor's workstation 610, 620 in the selected format.

Although, for ease of description, the report/entitlements subsystem has been described in terms of an on-line combined subsystem for report functions and for entitlement status viewing/modification functions, it will be understood that each such function may be provided (if at all) by a separate subsystem—a report subsystem for reports and an entitlement subsystem for entitlement status viewing/modification. Such functions may also be performed in a batch-mode.

Restriction Processing

Even though a user or may be "entitled" to review documents within a particular document group, in an exemplary embodiment of the present invention, a user may still be prevented from accessing, or possibly even listing particular research documents related to a particular company based on the "restriction" status and/or the "review" status of the company relative to the contributor of the research documents, in order to comply with SEC laws. The present invention provides a mechanism for a contributor to dynamically identify to the system the "restriction" status and/or the "review" status of particular companies (relative to that contributor). The present invention also provides a mechanism for controlling the display of document titles and the access of documents based on, in part, such status.

Identification Of Status

In the exemplary embodiment of the present invention, each participating contributor may identify the "restriction" and "review" status of one or any number of companies relative to that contributor. The restriction and review status include, for example:

"restricted": the contributor has a current banking or financial interest in the company;

"under review": an external event occurred which may affect the contributor's opinion of the company; and "under extended review": the company is not being covered by the contributor, thus previous reports are no longer valid; or the contributor is having discussions with the company about a relationship involving a banking interest.

Other status options are, of course, possible.

Figure 11:
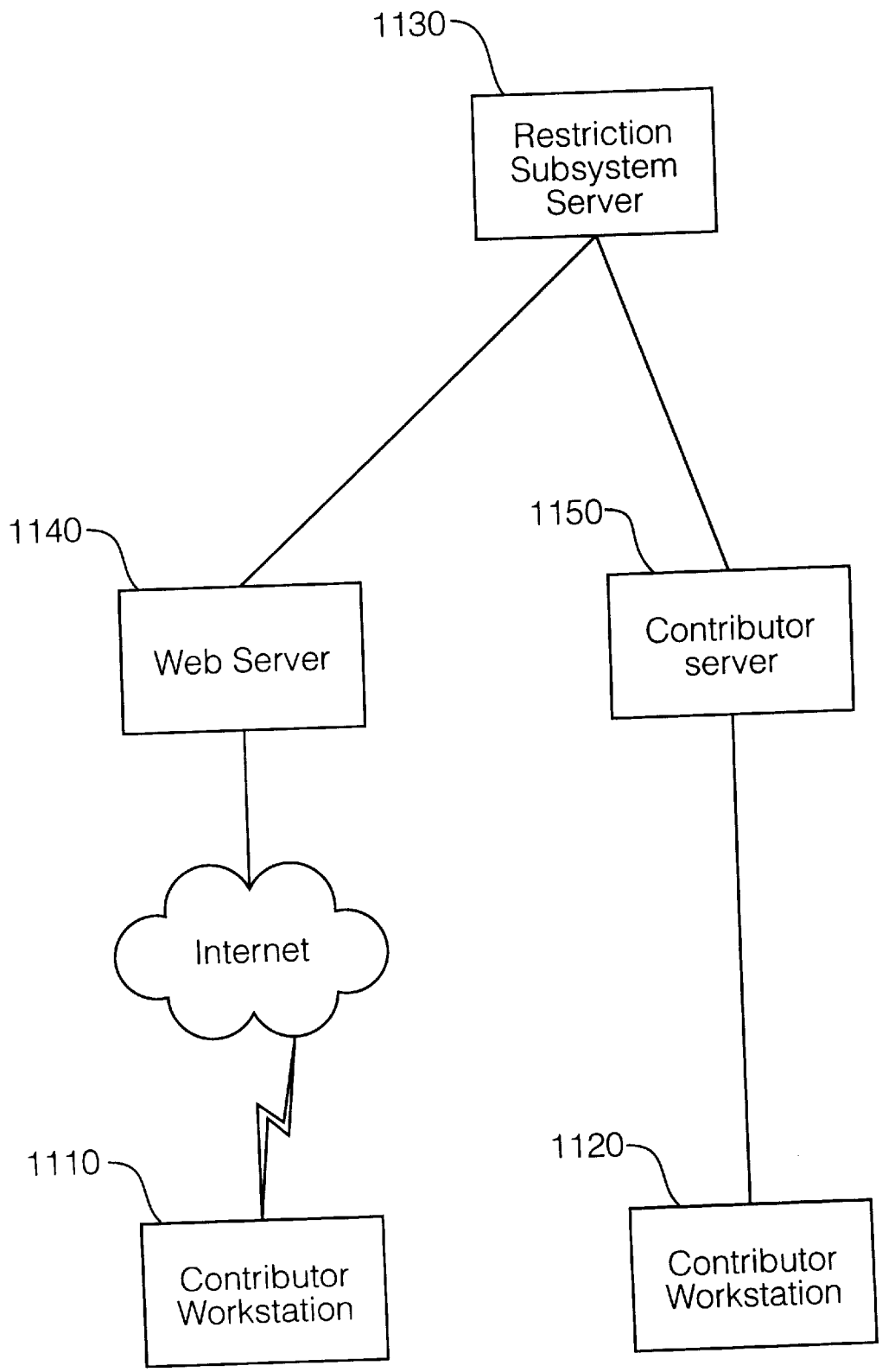
FIG. 11 illustrates the overall system architecture of an exemplary restriction subsystem.

FIG. 11 illustrates the overall system architecture of one possible system supporting the dynamic identification of "restriction" and "review" status by contributors. Referring to FIG. 11, contributor workstations 1110, 1120 (typically located at a site remote from the repository server 2) are selectively coupled to a restriction subsystem server 1130 (which includes a restriction database 1135) via, for example, a Web server 1140 (over the Internet) or over a proprietary network through a contributor server 1150. The subsystem server 1130 is additionally in communication with the repository server 2 of FIG. 5 (or FIG. 4) (not shown in this figure).

The restriction subsystem server, and corresponding restriction database 1135, manage and store records related to the "restriction" status of companies relative to particular contributors. Each record may include the following fields:

CtbID: the identification of a contributor;

Symbols: the ticker symbol associated with a company;

Xchange: on which stock exchange the ticker symbol is listed (e.g., NYSE);

SymbolName: the name of the particular company associated with the ticker symbol;

Restricted: the restriction status of the company relative to the contributor (e.g., "Y" for yes or "N" for no).;

RestrictedDate: the date the restriction status was changed;

RestrictedTime: the time the restriction status was changed;

Review: the review status of the company relative to the contributor (e.g., "Y" for "under review", "N" for "not under review", and "X" for "under extended review";

ReviewDate: the date the review status was changed; and

ReviewTime: the time the review status was changed.

Auto-contribution Updates

The contributor may use the "auto-contribution" program to transmit a file to the restriction subsystem server 1130 (via, for example, the web server 1140 or contributor server 150) which provides the server with restriction database updates. An exemplary file is listed below:

```
[IDENTIFIERS]
CtbID=2                //id of contributor company//
UserID=MC              //id of particular user//
Password=MC            //user password//
RecordType=CST
Action=UPD             //this is an update//

[RESTRICTIONS]
Restricted=Y           //restricted//
RestrictDate=10/11/95
RestrictedTime=12:59:01
Review=X               //under extended review//
ReviewDate=10/10/95

[Symbols]
Primary=DRE,NAY,26441150  //Symbols (DRE, NAY) and SymbolID
(26441150)//
```

Upon receiving the file, the restriction server verifies the contributor's identification (CtbID) and the user's identification and password (UserID and Password, respectively). The restriction subsystem them removes all records against the contributor in preparation for the update. The restriction update request is then processed as is described in further detail below.

If the contributor wishes to request many restriction updates at once (for example, if the contributor is new, or to completely replace all of the contributor's previous restriction entries for synchronization purposes), the contributor may, instead, use the auto-contribution program to transmit a table of updates, and corresponding data file to the restriction subsystem server 1130. An exemplary table (table 1) is shown below:

TABLE 1

Restrict.dat

| Symbol ID | Restricted | Restricted Date | Restrict Time | Review | ReviewDate | ReviewTime |
|---|---|---|---|---|---|---|
| adbe | Y | 10/10/1995 | 10:10:10 | Y | 10/10/1995 | 11:11:11 |
| dec | N | | | Y | 01/01/1997 | 12:12:12 |
| ibm | N | | | X | 01/01/1997 | 08:00:08 |

The data file corresponding to the restriction update table provides the auto-contribution program with the file path of the file containing the restriction table. The data file, transmitted to the restriction subsystem server 1130 with the update table, provides the restriction subsystem server with data related to the contributor, and also related to the update table. A listing of an exemplary data file is shown below:

```
[IDENTIFIERS]
CtbID=2                //id of contributor company//
UserID=MC              //id of particular user//
Password=MC            //user password//
RecordType=CST         //type of record//
Action=UPDT            //this is an update action//

[TABLE]
TablID=123456          //identification number of table//
TableType=CST          //type of table//
TableDesc=Restriction Table  //description of table//
Date=12/31/95          //date of table//
Time=12:59:45          //time of table//
Tablepath=c:\temp\restrict.dat  //file path of table//
```

Upon receiving the update table and corresponding data file, the restriction subsystem server 1135 verifies the contributor's identification (CtbID) and the user's identification and password (UserID and Password, respectively). The restriction update request is then processed as is described in further detail below.

Restriction Uopdate Request Processing

As described above, the restriction subsystem server 1130 and corresponding restriction database 1135 manage and store the "restriction" and/or "review" status of ticker symbols relative to each contributor.

In this embodiment, there exists only one record including a particular contributor id/ticker symbol combination. For example, CtbID=123456 appears only once in a record in combination with a Symbols="DIS." However, another record may include, for example:

CtbID=123456 && Symbols="IBM," or

CtbID=654321 && Symbols="DIS."

The restriction subsystem server maintains the database 1135 as an "in memory" database. That is, while a (relatively) more permanent copy of the database 1135 is stored on, for example, a magnetic medium such as a disk, the database 1135 is also stored in a higher speed memory such as, for example, RAM or SRAM so that database accesses and modifications are very fast.

When the restriction subsystem server 1130 receives an update request from a contributor, (in the form of, for example, an auto-contribution file or table), the subsystem server 1130 first queries the database 1135 to determine whether a record already exists for the particular contributor id/ticker symbol combination (as set forth in the modification task). The action the subsystem server 1130 takes (relative to the database 1135) is determined based on whether or not such a record exists, and also depends on the requested restriction status and review status, as is set forth in the following table:

| Requested Record Status | Record Exists In Database | Record Does Not Exist In Database |
|---|---|---|
| Restriction="N" (not restricted) && Review="N" (not under review) | delete record | do nothing |
| Restriction="Y" (restricted) OR Review="Y" (under review) OR Review="X" (under extended review) | update record | add record |

When the restriction database 1135 is changed, i.e., a record is added, deleted, or modified, the "in-memory" database is flushed to disk. All servers that maintain an "in memory" copy of the restriction database, such as, for example, the repository server 2 of FIG. 5, are notified (for example, by the restriction subsystem server) that the database has changed. Accordingly, each of these servers reloads the changed restriction database 1135.

Although, for ease of description, the restriction update process has been described in terms of an auto-contribution program, it will be understood that there are other possible ways that the restriction updates be entered into the restriction database. For example, the contributor may submit the update requests on paper to a restriction database administrator. The changes may then be entered into the database manually.

Review/Modification Via Web Pages

Figure 12:
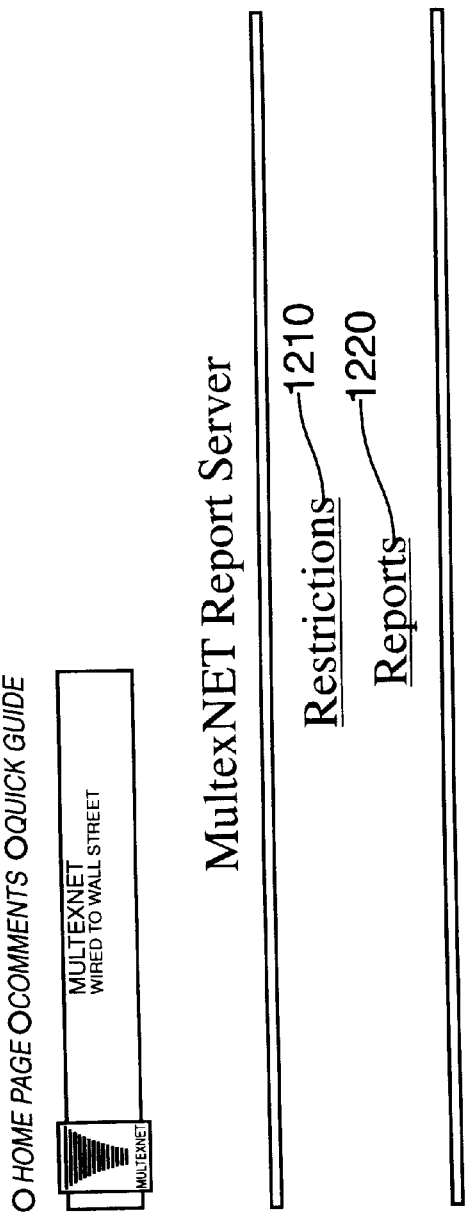
FIG. 12 is an example of an initial menu presented to a contributor accessing the exemplary restriction subsystem.

In an alternate embodiment, a contributor may review or modify restrictions via web pages. In this alternate embodiment, the contributor connects to the restriction subsystem server 1130 and logs in (in a manner, for example, similar to that described above). The subsystem server 1130 presents the contributor (via the Internet as a web page or via a proprietary network) with an initial menu. As example of such a menu is illustrated in FIG. 12. As shown, the contributor may chose to review and/or modify restrictions associated with particular companies symbols by clicking on "Restrictions" 1210. Additionally, the a contributor may chose to create a report by clicking on "Reports" 1220.

Figure 13:
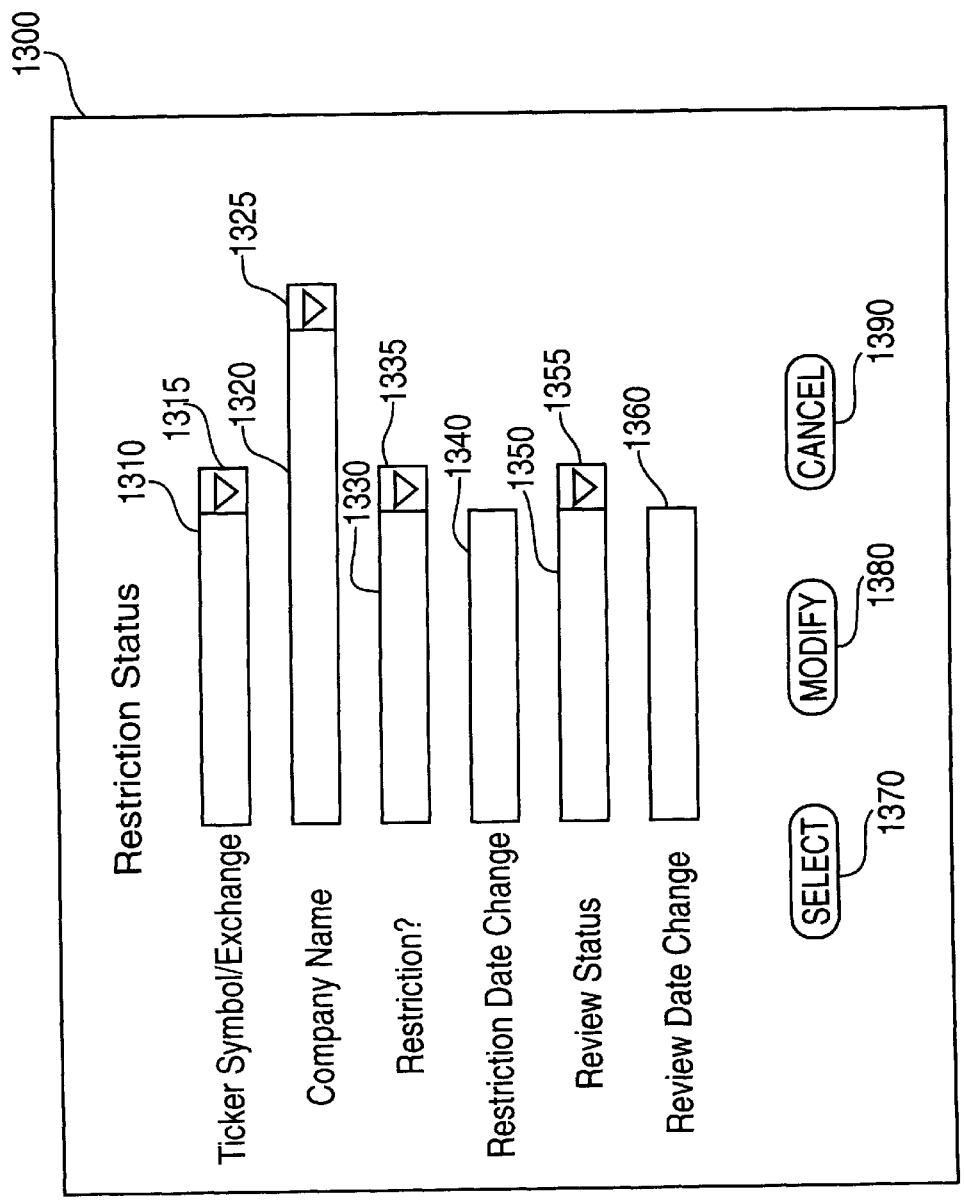
FIG. 13 is an example of a selection/modification displaying or modifying information in the restriction database of the restriction subsystem.

If the contributor selects "Restrictions," the subsystem server 1130 presents the contributor (via a web server) with a selection/modification page 1300 as illustrated in FIG. 13 for displaying or modifying information in the restriction database. The selection/modification page 1300 includes 6 display/input boxes:

ticker symbol/exchange 1310: the ticker symbol and stock exchange associated with a particular company (selectable via drop down box 1315, the contents of which are not shown)—generally associated with the Symbols and Xchange fields of the restriction database;

company name 1320: the name of the particular company (selectable via down box 1325, the contents of which are not shown)—generally associated with the SymbolName field of the restriction database;

restriction 1330: the restriction status of the company relative to the contributor. The value in this field may be "NO RESTRICTION" or "RESTRICTION" (selectable via drop down box 1335, the contents of which are not shown)—generally associated with the Restricted field of the restriction database.

restriction change date/time 1340: the date and the restriction status was changed—generally associated with the RestrictedDate and RestrictedTime fields of the restriction database;

review status 1350: the review status of the company relative to the contributor. The value in this field may be "NOT UNDER REVIEW," "UNDER REVIEW," or "UNDER EXTENDED REVIEW" (selectable via drop down box 1355, the contents of which are not shown)—generally associated with the Review field of the restriction database;

review change date/time 1360: the date and time the review status was changed—generally associated with the ReviewDate and ReviewTime fields of the restriction database.

The selection/modification page 1300 also includes three action buttons:

select 1370: requests a display of information from the restriction database meeting the criteria set forth in the input boxes 1310, 1320, 1330, 1340, 1350, 1360;

modify 1380: requests that information in the restriction database be modified in the manner set forth in input boxes 1310, 1320, 1330, 1350; and cancel 1390: return to the initial menu illustrated in FIG. 12.

Status Display

The flowchart of FIG. 14 illustrates an exemplary procedure for displaying, at a contributor workstation, the status of a particular company (relative to the contributor). The contributor inputs the database search criteria into one or more of the input boxes (step 1410). For example, the contributor may input stock ticker symbol DIS into box 1310. The contributor then selects the select button 1370. As a result, all of the information input by the contributor (i.e., search criteria) is transmitted to the restriction subsystem server 1130 (step 1420) in the form of a selection task.

When the subsystem server 1130 receives the selection task, a webserver program (CGI program) queries database 1130 for restriction information meeting the search criteria requested by the contributor, and also corresponding to that particular contributor (e.g., Symbols="DIS" && CtbID= 123456)(step 1430). The subsystem server 1130 transmits all search results to the contributor workstation (step 1440).

If only one company meets the search criteria, the contributor workstation displays the information received by filling in the input boxes 1310, 1320, 1330, 1340, 1350, 1360 with the corresponding received information (step 1450). If, however, more than one company meets the search criteria (for example, if the contributor had not entered a stock ticker symbol, and had instead entered only a review status), the contributor workstation displays a list of companies meeting the search criteria from which the contributor may select. The information corresponding to the selected company is then displayed in the input boxes 1310, 1320, 1330, 1340, 1350, 1360 (step 1450).

If the stock ticker symbol is not found in the restriction database because, for example, the corresponding company is not under restriction, not under review, and not under extended review, the restriction subsystem server determines the company name (possibly by querying a separate database), and then returns the stock ticker symbol, and the company name associated therewith, to the contributor's workstation. The contributor's workstation then displays the ticker symbol and company name in input boxes 1310 and 1320 (respectively), and fills in defaults for the remaining fields, for example:

restriction 1330: NO RESTRICTION restriction change date/time 1340: 00/00/0000 00:00:00 review status 1350: NOT UNDER REVIEW review change date/time 1360: 00/00/0000 00:00:00

Modification of status

Referring now to the flowchart of FIG. 15, there is illustrated an exemplary procedure for modifying restriction information in the restriction database 1135. The illustrated procedure is typically performed after a contributor has first "selected" a company (e.g., by performing the procedure of FIG. 14).

In the exemplary embodiment, the contributor may request modification of restriction information and/or review status information associated with the displayed stock ticker. Specifically, the contributor replaces the information in the restriction input box 1330 and/or the review status input box 1350 with the desired new information (step 1510). The contributor then clicks on the "MODIFY" action button 1380. As a result, information now displayed in the selection/modification page 1300 (e.g,, ticker symbol, restriction status, and review status) is transmitted to the restriction subsystem server 1130 in the form of a restriction modification task(step 1520).

Upon receipt of the modification task, the restriction subsystem server 1130 first enqueues the modification task on its task queue. When the modification task is eventually executed (in due course, by the restriction subsystem server 1130), the restriction subsystem server "enters" a restriction modification by either adding a record, deleting a record, or modifying a record in the database in depending on the contributor's request (as described above) (step 1530).

After the restriction database has been appropriately modified, the restriction subsystem server 1130 transmits new restriction information to the contributor's workstation, including, for example, the new restriction date (and time) and the new review date (and time) (step 1540). The contributor workstation then displays the new information (step 1550).

Reports

Figure 16:
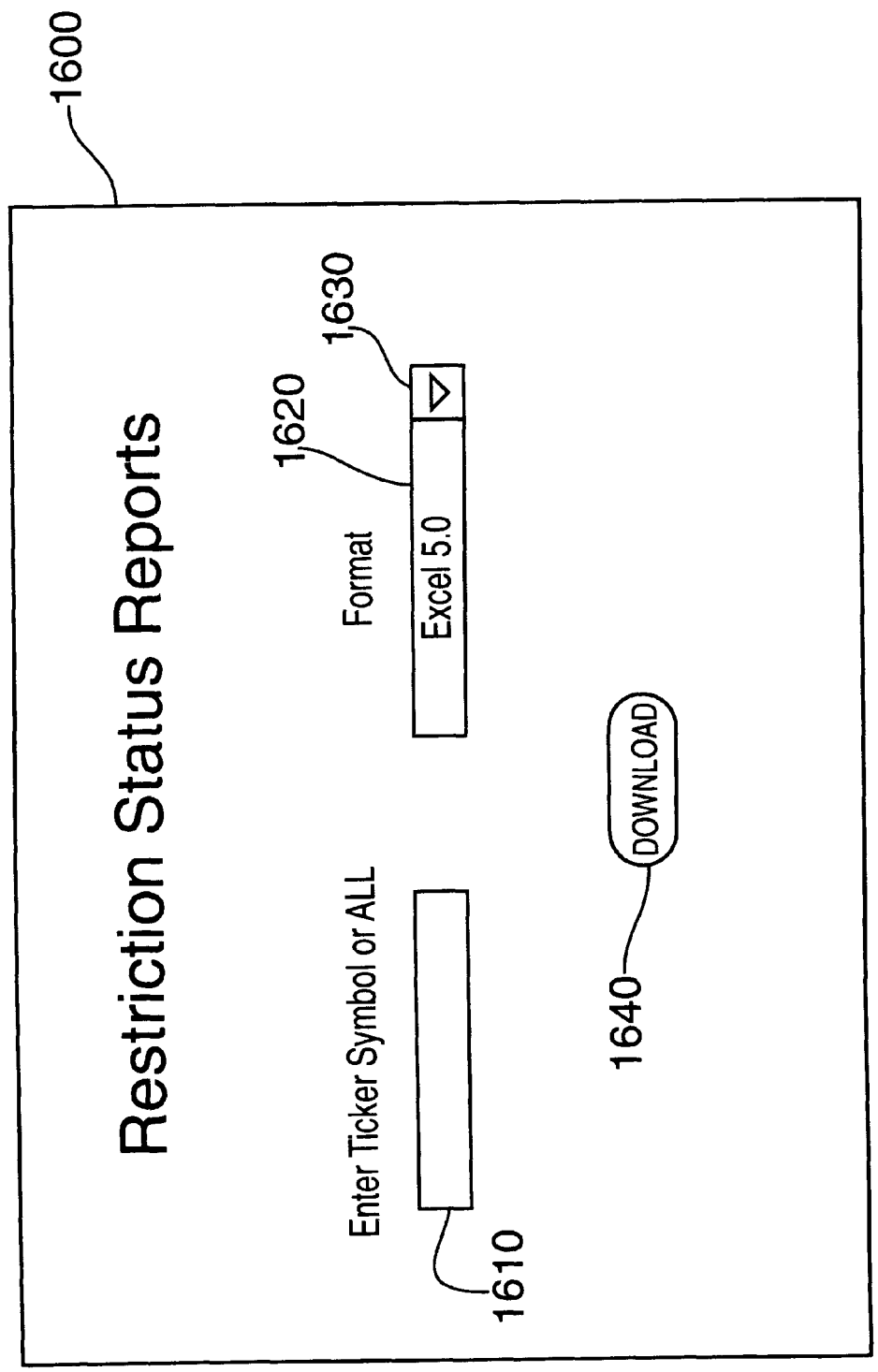
FIG. 16 is illustration of an illustrative restriction status report page.

If the contributor clicks on "Reports" 1220 displayed in the initial menu (FIG. 12), the subsystem server 1130 presents the contributor with a Restriction Status Reports page 1600 as illustrated in FIG. 16. Using this page 1600, the contributor may request a report (in a selected format) to be downloaded to the contributor's workstation. Referring now to FIG. 6, the contributor enters either a selected ticker symbol or "ALL" in input box 1610. The contributor then selects the desired format for the report either by typing in a format title or by selecting a format from a drop down menu 1630 (the contents of which are not illustrated). The format choices may include, for example, Excel 5.0, WordPerfect 6.1, Microsoft Word For Windows 6.0, etc. The contributor then transmits the request to the restriction subsystem server 1130 by clicking on a download action button 1640. In response thereto, the restriction subsystem server 1130 queries the database 1135 for all records corresponding to the contributor, and matching the selected ticker symbol. If "ALL" was selected, the subsystem server 1130 queries the database for all records corresponding to contributor. The subsystem server than converts the records obtained from the query to a report in the selected format, and transmits the report to the contributor's workstation.

Restriction Processing

As noted above, the present invention includes a mechanism for controlling the ability for a user to display and access a document based, in part, on the "restriction" and "review" status of the company (relative to the document contributor) that is the subject of the document. In the exemplary embodiment, the repository server 2 of FIG. 5 stores a copy of the restriction database (1135) (obtained, for example, from the restriction subsystem server 1130) in high speed memory such as, for example, RAM or SRAM. Each time the repository server 2 is queried for a list of reports or documents (i.e., document titles or headlines), the repository server 2 determines whether to provide the title to the contributor workstation (via a contributor server or web server) to the user based on the information in the "in memory" restriction database.

Figure 17:
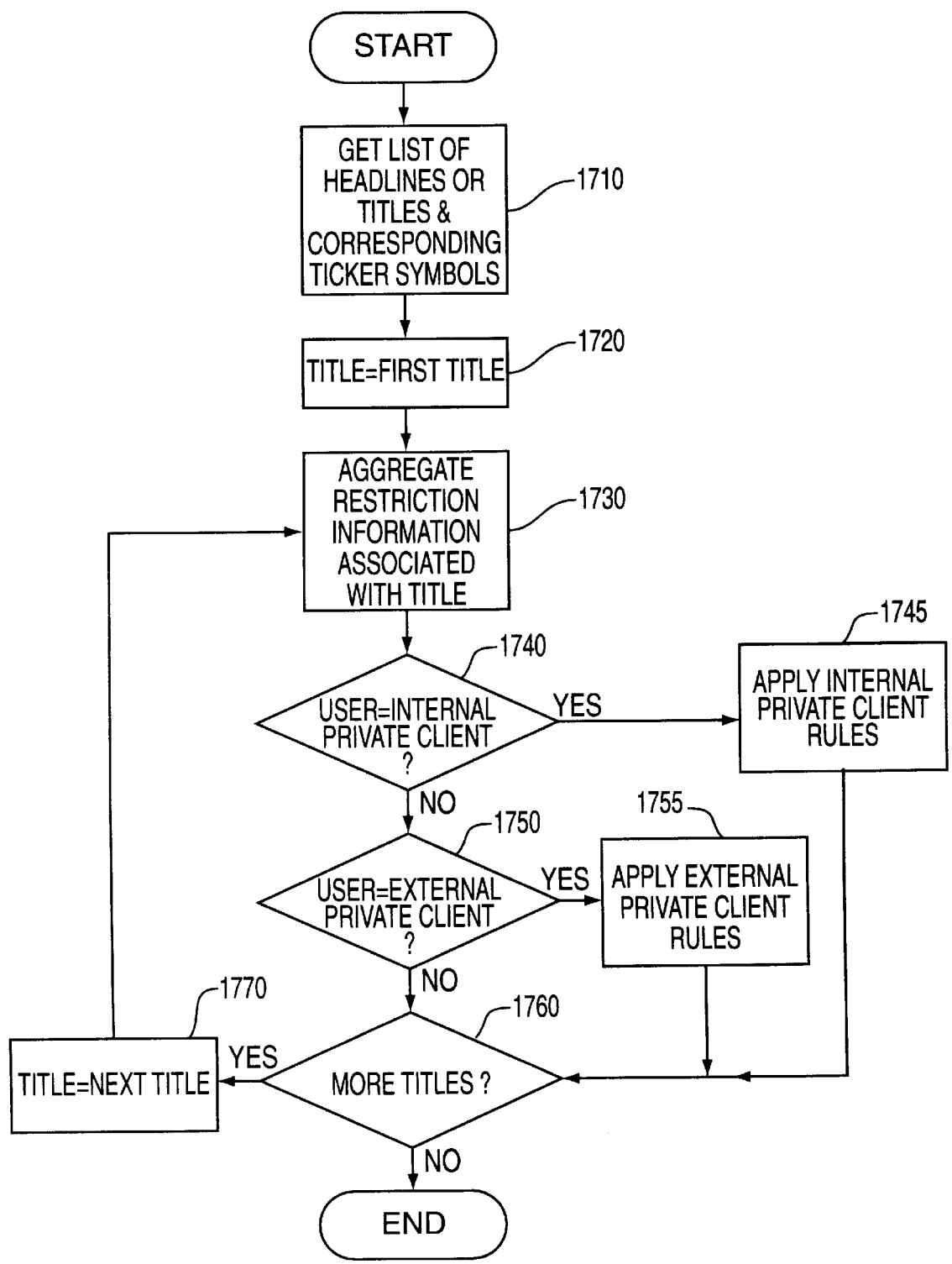
FIG. 17 is a flowchart of a process for processing a list of titles in accordance with the exemplary embodiment of the present invention

FIG. 17 is a flowchart of a process for processing a list of titles in accordance with the exemplary embodiment of the present invention. Referring now to FIG. 17, in response to a request for a list of documents, the repository server 2 retrieves a list of titles of documents to which the user is "entitled" (step 1710). Additionally, the repository server 2 retrieves any ticker symbols corresponding to the subject matter of each of these documents (such as, for example, those ticker symbols that are provided in each document's corresponding document profile)(step 1710). Each retrieved document title (and corresponding ticker symbol) is then processed.

The repository server 2 "aggregates" the restriction information for all of the ticker symbols associated with first document (step 1720, 1730). That is, since a document may have a number of ticker symbols associated therewith, the repository system 2 combines the restriction information in order to form aggregate restriction information. A more detailed description of an exemplary method of aggregating restriction information is set forth below.

Next, the aggregate restriction information for the title is processed in order to determine whether or not the title should be provided to the user. If the user is an "Internal Private Client" (e.g., an employee of the contributor), the following rules are applied (step 1740, 1745):

if any ticker symbol associated with the document is under restriction and the release date and time of the document is prior to the restriction date and time, the title may be displayed by the user but the title is marked as "not retrievable." That is, the user can display the title of the document but cannot access the corresponding document;

otherwise, the title may be displayed and the document corresponding to that title may be accessed.

If, instead, the user is an "External Private Client" (e.g., an investor-client of the contributor), the following rules are applied (step 1750, 1755):

if a ticker symbol associated with the document is under restriction and the release date and time of the document is prior to the restriction date and time, the title may not be displayed by the user and the user cannot access the corresponding document;

if a ticker symbol associated with the document is not under restriction, but the a ticker symbol associated with the document is either under review or under extended review AND the document release date is prior to the review date and time, the title may not be displayed by the user and the document associated with that title cannot be accessed by that user, and the headline is marked "under review" or "under extended review;"

otherwise, the title may be displayed and the document corresponding to that title may be accessed.

This process is repeated for all titles in the list (see steps 1760, 1770).

Aggregation

As noted above, the repository server 2 aggregates the restriction information associated with all the ticker symbols associated with a particular title or document. The following pseudo code illustrates one exemplary aggregation procedure:

```
/* Initialize variables */
ARestriction.RestrictionStatus=No Restriction        //Restriction Status
ARestriction.RestrictionTimeDate=Nodate              //Restriction time date
ARestriction.RestrictionTicker=""                    //Ticker that caused
                                                       restriction
ARestriction.ReviewStatus=No Restriction             //Review Status
ARestriction.Review/TimeDate=Nodate                  //Review Time Date
                                                     //Ticker that caused
                                                       review
//Get the first ticker in the ticker list
CurrentTicker = Nextticker(tickers)
/*Keep more restrictive and review status */
/*do until all ticker symbols are processed */
Do While (CurrentTicker exists)
   //Get the restriction status associated with the current ticker
   CurrentRestriction = GetRestrictedStatus(CurrentTicker)
   //This tickers restriction controls if the restriction exists and the
   date is after the
//current restriction date
   if (CurrentRestriction.RestrictionStatus = "Restriction") then
      if
(CurrentRestriction.RestrictionTimeDate>
ARestriction.RestrictionTimeDate)then
         ARestriction.RestrictionTimeDate = Current Restriction.
         Restriction
         TimeDate
```

```
       ARestriction.RestrictionStatus =
       CurrentRestriction.RestrictionStatus
       Arestriction.RestrictionTicker=CurrentTicker
     endif
   endif
   //This tickers review controls if the review status exists and
   the date is after the
   //current review date (review or extended review)
   if (CurrentRestriction.RestrictionStatus = "Review" OR
CurrentRestriction.RestrictionStatus = "Extended Review")then
     If (CurrentRestriction.ReviewTimeDate>AReview.
     ReviewTimeDate) then
       ARestriction.ReviewTimeDate =
       CurrentRestriction.ReviewTimeDate
       ARestriction.ReviewStatus = CurrentRestriction.ReviewStatus
       ARestriction.ReviewTicker = CurrentTicker
     endif
   endif
   CurrentTicker=NextTicker(tickers)
enddo
```

As will be understood by a person of ordinary skill in the art, the aggregation procedure sets each of the aggregation status variables (i.e., RestrictedStatus, ReviewStatus, RestrictionTimeDate, ReviewTimeDate, RestrictionTicker, ReviewTicker) to the most restrictive status, e.g.,:

if any one of the tickers in the list is a restricted company then RestrictionStatus is set to "RESTRICTION," the RestrictionTimeDate are set to the latest date that a ticker was restricted, and RestrictionTicker is set to that latest restricted ticker symbol;

if any one of the tickers is "UNDER EXTENDED REVIEW," then ReviewStatus="UNDER EXTENDED REVIEW;"

if none of the tickers are "UNDER EXTENDED REVIEW" but at least one ticker is "UNDER REVIEW," then ReviewStatus="UNDER REVIEW;"

if none of the tickers are "UNDER EXTENDED REVIEW" or "UNDER REVIEW," then ReviewStatus="NOT UNDER REVIEW;"

ReviewTimeDate, and ReviewTicker are set to ReviewTimeDate, TickerSymbol (respectively) of the ticker that was set to "UNDER EXTENDED REVIEW" or "UNDER REVIEW" and had the most recent date/time.

For example, if the current title is for a document concerning three ticker symbols DIS, IBM, and T, wherein:

| DIS: | not restricted | | |
| | not under review; | | |
| IBM: | restricted | 01/06/1997 | 14:31:01 |
| | under review | 01/10/1097 | 09:51:08 |
| T: | not restricted | | |
| | under extended review | 12/08/1996 | 15:07:55 | then the following will be set by the procedure:

| | |
|---|---|
| RestrictedStatus= | "RESTRICTION" |
| ReviewStatus= | "UNDER EXTENDED REVIEW" |
| RestrictedDateTime= | 01/06/1997 14:31:01 |
| ReviewDateTime= | 01/10/1997 09:51:08 |
| RestrictedTicker= | "IBM" |
| ReviewTicker= | "IBM" |

Other embodiments

Although the invention has been described with reference to a particular embodiment and arrangement of parts, features and the like, the above disclosure is not intended to exhaust or limit all possible embodiment, arrangements or features, and indeed, many other modifications and variations will be ascertainable to those skilled in the art. For example, the repository server 2 may distribute reports by other networks in addition to the Internet. It is noted that the web server 4 and repository server 2 of the representative embodiment of the present invention can be implemented utilizing a logic circuit or a computer memory comprising encoded computer-readable instructions, such as a computer program. The functionality of the logic circuit or computer memory has been described in detail above. Generally, the present invention has practical application as it enables reports and other information to be distributed speedily and searched efficiently by authorized users in remote locations.

The above described embodiments are merely illustrative of the principles of the present invention. Other embodiments of the present invention will be apparent to those skilled in the art without departing from the spirit and scope of the present invention.

What is claimed is:

1. A method for providing a list of identifiers corresponding to a plurality of electronic documents, the documents being stored in a central repository, each of the documents being associated with a corresponding contributor, a corresponding company, and a corresponding identifier, the method comprising the steps of:

electronically receiving from a remote computer a request for a list of identifiers;

selecting a subset of the documents in accordance with the request;

for each of the documents in the subset, i) comparing the corresponding contributor and the corresponding company with stored data, the stored data identifying a stored contributor, a stored company, and an identified relationship between the stored contributor and stored company;

ii) if the corresponding contributor matches the stored contributor, and the corresponding company matches the stored company, determining whether to exclude the corresponding identifier from the list of identifiers as a function of the identified relationship; and transmitting the list of identifiers to the remote computer.

2. The method of claim 1 further comprising the step of:

if the corresponding contributor matches the stored contributor, and the corresponding company matches the stored company, and the identified relationship identifies the stored company is "restricted" relative to the stored contributor, excluding the corresponding identifier from the list of identifiers.

3. The method of claim 1 further comprising the step of:

if the corresponding contributor matches the stored contributor, and the corresponding company matches the stored company, and the identified relationship identifies the stored company is "restricted" relative to the stored contributor, and the remote terminal is associated with an "external" client of the corresponding contributor, excluding the corresponding identifier from the list of identifiers.

4. The method of claim 1 further comprising the step of:

if the corresponding contributor matches the stored contributor, and the corresponding company matches the stored company, and the identified relationship identifies the stored company is "restricted" relative to the stored contributor, and the remote terminal is associated with an "internal" client of the corresponding contributor, including the corresponding identifier from the list of identifiers.

5. The method of claim 1 further comprising the steps of:

if the corresponding contributor matches the stored contributor, and the corresponding company matches the stored company, determining whether to transmit to the remote terminal access data indicating that the corresponding document is inaccessible by the remote terminal as a function of the identified relationship.

6. The method of claim 5 wherein the determining step further comprising the step of:

if the identified relationship identifies that the stored company is not "restricted" and is "under review" relative to the stored contributor, and the remote terminal is associated with an "external" client of the corresponding contributor, transmitting the access data to the remote terminal.

7. A method for providing a list of document headlines corresponding to a plurality of electronic documents, the documents being stored in a central repository, each of the documents being associated with a corresponding contributor, a corresponding company, and a corresponding document headline, the method comprising the steps of:

electronically receiving from a remote computer a request for a list of document headlines;

selecting a subset of the documents in accordance with the request;

for each of the documents in the subset,
i) comparing the corresponding contributor and the corresponding company with stored data, the stored data identifying a stored contributor, a stored company, and an identified relationship between the stored contributor and stored company;
ii) if the corresponding contributor matches the stored contributor, and the corresponding company matches the stored company, determining whether to exclude the corresponding document headline from the list of document headlines as a function of the identified relationship; and transmitting the list of document headlines to the remote computer.

8. The method of claim 7 further comprising the step of:

if the corresponding contributor matches the stored contributor, and the corresponding company matches the stored company, and the identified relationship identifies the stored company is "restricted" relative to the stored contributor, excluding the corresponding document headline from the list of headlines.

9. A system for providing a list of document headlines corresponding to a plurality of electronic documents, the documents being stored in a central repository, each of the documents being associated with a corresponding contributor, a corresponding company, and a corresponding document headline, the system comprising:

a server selectively coupled to a remote computer; and a memory device coupled to the server, the memory device storing a contributor identifier associated with a contributor and a company identifier associated with a company, the database further, the database further storing relationship information identifying a relationship between the contributor and the company;

wherein the server receives from the remote computer a request for a list of document headlines and selects documents in accordance with the request, and for each of the documents in the subset, the server
i) compares the corresponding contributor and the corresponding company with stored data, the stored data identifying a stored contributor, a stored company, and an identified relationship between the stored contributor and stored company;
ii) if the corresponding contributor matches the stored contributor, and the corresponding company matches the stored company, the server determines whether to exclude the corresponding document headline from the list of document headlines as a function of the identified relationship, and wherein the server transmits the list of document headlines to the remote computer.

* * * * *

UNITED STATES PATENT AND TRADEMARK OFFICE
CERTIFICATE OF CORRECTION

PATENT NO. : 5,940,843
DATED : August 17, 1999
INVENTOR(S) : Stephan M. Zucknovich, et al.

It is certified that error appears in the above-identified patent and that said Letters Patent is hereby corrected as shown below:

In the Abstract, change "includes" to --includes,--

Column 1, line 25, change "customer's," to read -- customers, --;

Column 2, line 32, change "an" to read -- a --;

Column 4, line 3, change "list" to read -- list of --;

Column 4, line 6, change "first" to read -- the first --;

Column 4, line 41, change "the a " to read -- the --;

Column 8, line 3, change "back" to read -- back to --;

Column 11, line 17, change "an" to read -- a --;

Column 13, line 13, change "2.----queries. The----" to read -- 2.----queries.

The---------- --;

Column 14, line 13, change "egligible" to read -- negligible --;

UNITED STATES PATENT AND TRADEMARK OFFICE
CERTIFICATE OF CORRECTION

PATENT NO. : 5,940,843
DATED : August 17, 1999
INVENTOR(S) : Stephan M. Zuchnovich, et al.

It is certified that error appears in the above-identified patent and that said Letters Patent is hereby corrected as shown below:

Column 14, line 16, change "delays hiding" to read -- delays, losing;

Column 14, line 41, change "docmument" to read -- document --;

Column 20, line 54, change "a" to read -- an --;

Column 21, line 4, change "a" to read -- an --;

Column 21, line 12, change "View Hode" to read -- View Mode --;

Column 21, line 30, change "opposed" to read -- opposed to --;

Column 23, line 27, change "=" to read -- := --;

Column 23, line 28, change "=" to read -- := --;

Column 23, line 29, change "=" to read -- := = = --;

Column 23, line 30, change "=" to read -- := --;

UNITED STATES PATENT AND TRADEMARK OFFICE
CERTIFICATE OF CORRECTION

PATENT NO. : 5,940,843
DATED : August 17, 1999
INVENTOR(S) : Stephan M. Zuchnovich, et al.

It is certified that error appears in the above-identified patent and that said Letters Patent is hereby corrected as shown below:

Column 23, line 36, change "("")" to read -- ("__")--;

Column 24, line 61, change " = " to read -- : = =--;

Column 24, line 61, above line "{mx.if synopsis...." insert -- {mx name = symbols width = 10} --;

Column 25, line 54, change "ticket" to read -- ticker--;

Column 25, line 64, change "ticket" to read -- ticker--;

Column 26, line 35, change "sever's " to read -- server's --;

Column 26, line 43, change "link" to read -- linked --;

Column 27, line 5, change "contacting" to read -- contact --;

Column 49, line 13, change "ticket" to read -- ticker --;

Column 49, line 21, change "the this" to read -- this --;

UNITED STATES PATENT AND TRADEMARK OFFICE
CERTIFICATE OF CORRECTION

PATENT NO. : 5,940,843
DATED : August 17, 1999
INVENTOR(S) : Stephan M. Zuchnovich, et al.

It is certified that error appears in the above-identified patent and that said Letters Patent is hereby corrected as shown below:

Column 49, line 52, change "satisfies" to read -- satisfy --;

Column 50, line 25, change "start" to read -- starts --;

Column 50, line 38, change "gave" to read -- given to --;

Column 78, lines 23-24, change "returns whether" insert -- responds as to whether --;

Column 79, line 48, change "chose" to read -- choose --;

Column 79, line 50, change "chose" to read -- choose --;

Column 80, line 6, change "chose" to read -- choose --;

Column 80, line 7, change "chose" to read -- choose --;

Column 85, line 18, change "chose" to read -- choose --;

Column 85, line 21, change "chose" to read -- choose --;

Column 85, line 17, change "As" to read -- Am --;

UNITED STATES PATENT AND TRADEMARK OFFICE
CERTIFICATE OF CORRECTION

PATENT NO. : 5,940,843
DATED : August 17, 1999
INVENTOR(S) : Stephan M. Zuchnovich, et al.

It is certified that error appears in the above-identified patent and that said Letters Patent is hereby corrected as shown below:

Column 88, line 26, change "the a " to read -- the --;

Column 90, line 47, change "is" to read -- as --;

Column 90, line 54, change "is" to read -- as --;

Column 90, line 63, change "is" to read -- as --;

Column 90, line 66, change "from" to read -- in --;

Column 92, line 5, change "is" to read -- as --; and

Column 92, line 19, delete (first occurrence of) "the database further, ".

Signed and Sealed this

Fifth Day of December, 2000

Attest:

Attesting Officer

Q. TODD DICKINSON

Director of Patents and Trademarks